US012627954B2

(12) United States Patent
Fan

(10) Patent No.: US 12,627,954 B2
(45) Date of Patent: May 12, 2026

(54) COMMUNICATION METHOD AND TERMINAL DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 319 days.

(21) Appl. No.: 18/379,463

(22) Filed: Oct. 12, 2023

(65) Prior Publication Data

US 2024/0040341 A1    Feb. 1, 2024

Related U.S. Application Data

(63) Continuation of application No. PCT/CN2021/088797, filed on Apr. 21, 2021.

(51) Int. Cl.
*H04W 4/12*      (2009.01)
*H04W 8/20*      (2009.01)
*H04W 88/06*     (2009.01)

(52) U.S. Cl.
CPC ............. *H04W 4/12* (2013.01); *H04W 8/205* (2013.01); *H04W 88/06* (2013.01)

(58) Field of Classification Search
CPC ........ H04W 8/205; H04W 4/12; H04W 88/06
USPC ......................................................... 455/418
See application file for complete search history.

(56) References Cited

U.S. PATENT DOCUMENTS

| | | | |
|---|---|---|---|
| 9,210,691 B2 | 12/2015 | Ponukumati | |
| 2015/0126187 A1 | 5/2015 | Ponukumati | |
| 2021/0345089 A1* | 11/2021 | Ke ........................... | H04W 8/24 |
| 2021/0345155 A1 | 11/2021 | Bao | |

FOREIGN PATENT DOCUMENTS

| | | | |
|---|---|---|---|
| CN | 111263458 A | 6/2020 | |
| CN | 111277997 A | 6/2020 | |
| CN | 111278001 A | 6/2020 | |
| CN | 111294986 A | 6/2020 | |
| CN | 112351497 A | 2/2021 | |
| EP | 3914014 A1 | 11/2021 | |
| EP | 4007440 A1* | 6/2022 | ............ H04W 72/23 |
| WO | 2015069601 A1 | 5/2015 | |
| WO | 2020147818 A1 | 7/2020 | |

OTHER PUBLICATIONS

International Search Report in the international application No. PCT/CN2021/088797, mailed on Dec. 6, 2021. 5 pages with English translation.

(Continued)

*Primary Examiner* — Jirapon Tulop
(74) *Attorney, Agent, or Firm* — BAYES PLLC

(57) ABSTRACT

Disclosed are a communication method and apparatus, and a device and a storage medium. The method is executed by a terminal device. The method comprises: sending a first message to a network device, wherein the first message carries cooperative working related information which is related to at least one SIM card of a terminal device.

13 Claims, 15 Drawing Sheets

(56)　　　　　　References Cited

OTHER PUBLICATIONS

Written Opinion of the International Search Authority in the international application No. PCT/CN2021/088797, mailed on Dec. 6, 2021. 8 pages with English translation.

3GPP TS 38.331 V16.3.1 (Jan. 2021), 3rd Generation Partnership Project; Technical Specification Group Radio Access Network; NR; Radio Resource Control (RRC) protocol specification (Release 16). Section 5 and/or 6.2 and/or 6.3. 929 pages.

Supplementary European Search Report in the European application No. 21937324.8, mailed on Apr. 26, 2024. 12 pages.

* cited by examiner

Network architecture 100

Access network

CN

Terminal device

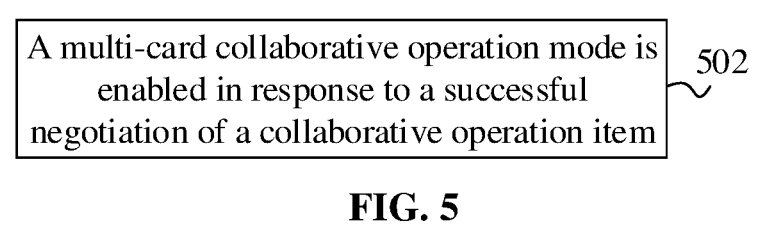

A multi-card collaborative operation mode is enabled in response to a successful negotiation of a collaborative operation item | 502

FIG. 5

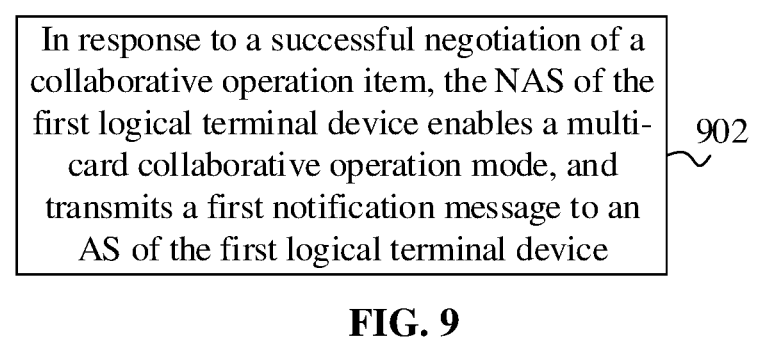

In response to a successful negotiation of a collaborative operation item, the NAS of the first logical terminal device enables a multi-card collaborative operation mode, and transmits a first notification message to an AS of the first logical terminal device    902

FIG. 9

A third association relationship between at least two CN contexts is established in response to the CN device accepting the collaborative operation item          1002

Configuration information in any CN context in the at least two CN contexts is updated based on the third association relationship          1004

COMMUNICATION METHOD AND TERMINAL DEVICE

CROSS-REFERENCE TO RELATED APPLICATION

This application is a continuation application of International Patent Application No. PCT/CN2021/088797, filed on Apr. 21, 2021, the disclosure of which is hereby incorporated by reference in its entirety.

BACKGROUND

At present, a terminal device supports inserting a plurality of Subscriber Identity Module (SIM) cards, which can be considered as running a plurality of logical terminal devices on a hardware resource corresponding to the terminal device.

In a related art, various logical terminal devices on the same hardware resource perform task processing independently from each other.

SUMMARY

Embodiments of the disclosure provide a communications method and terminal device. Technical solutions are as follows.

According to an aspect of the embodiments of the disclosure, a communication method is provided. The method is performed by a terminal device, and includes the following operations. A first message is transmitted to a network device, the first message carrying collaborative operation related information which is related to at least one Subscriber Identity Module (SIM) card of the terminal device.

According to an aspect of the embodiments of the disclosure, a communication method is provided. The method is performed by a network device, and includes the following operation. A first message transmitted by a terminal device is received. The first message carries collaborative operation related information which is related to at least one SIM card of the terminal device.

According to an aspect of the embodiments of the disclosure, a terminal device is provided. The terminal device includes a transceiver. The transceiver is configured to transmit a first message to a network device, the first message carrying collaborative operation related information which is related to at least one SIM card of the terminal device.

BRIEF DESCRIPTION OF THE DRAWINGS

In order to describe the technical solutions in the embodiments of the disclosure more clearly, the drawings required to be used in descriptions about the embodiments will be simply introduced below. Apparently, the drawings in the following descriptions are only some embodiments of the disclosure. Those of ordinary skill in the art may further obtain other drawings according to these drawings without creative work.

FIG. 5 is a flowchart of a communication method provided by another embodiment of the disclosure.

FIG. 9 is a flowchart of a communication method provided by another embodiment of the disclosure.

DETAILED DESCRIPTION

To make the objectives, technical solutions, and advantages of the disclosure clearer, implementations of the disclosure will be further described in detail with reference to the accompanying drawings.

Network architecture and service scenarios described in the embodiments of the disclosure are intended to describe the technical solutions in the embodiments of the disclosure more clearly, but are not intended to limit the technical solutions provided in the embodiments of the disclosure. Those of ordinary skill in the art may know that as the network architecture evolves and a new service scenario emerges, the technical solutions provided in the embodiments of the disclosure are also applicable to a similar technical problem.

Figure 1:
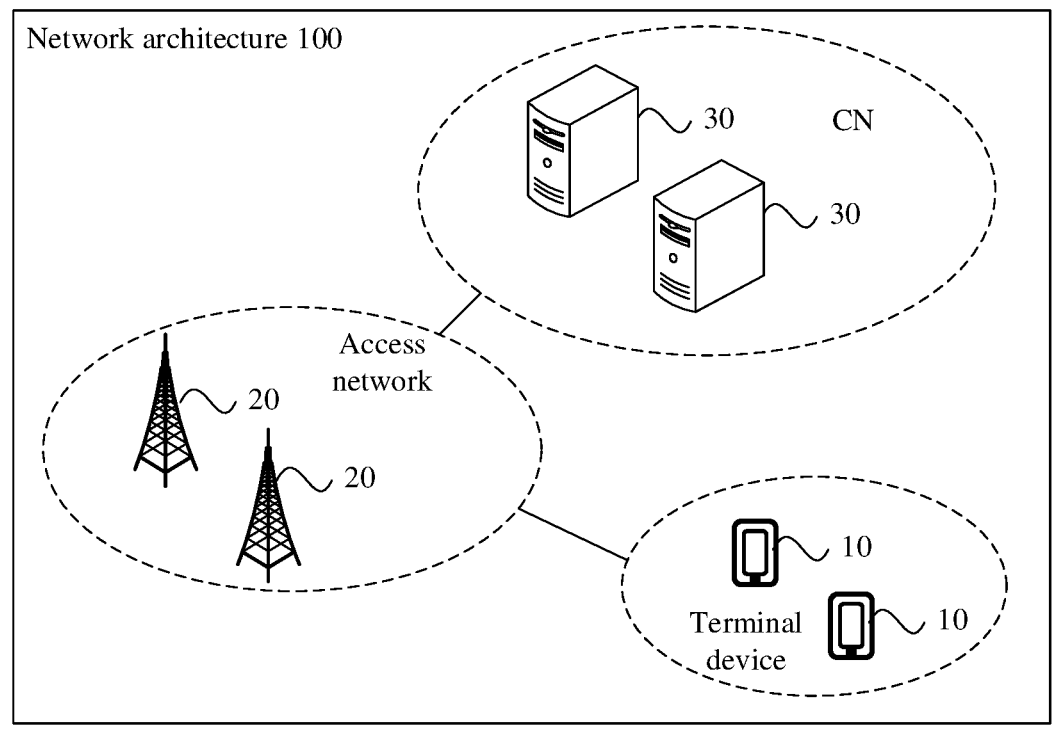
FIG. 1 illustrates a schematic diagram of network architecture provided by an embodiment of the disclosure.

Refer to FIG. 1, it is a schematic diagram of network architecture 100 provided by an embodiment of the disclosure. The network architecture 100 may include a terminal device 10, an access network device 20, and a core network device 30.

The terminal device 10 may refer to a User Equipment (UE), an access terminal, a user unit, a user station, a mobile station, a mobile console, a remote station, a remote terminal, a mobile device, a wireless communication device, a user agent, or a user apparatus. Optionally, the terminal device 10 may also be a cellular phone, a cordless phone, a Session Initiation Protocol (SIP) phone, a Wireless Local Loop (WLL) station, a Personal Digital Assistant (PDA), a hand-held device having a wireless communication function, a computing device or other processing devices connected to a wireless modem, an on-board device, a wearable device, a terminal device in a 5th Generation System (5GS), a terminal device in a Public Land Mobile Network (PLMN) in future evolution, or the like, which will not be limited in the embodiments of the disclosure. In order to facilitate description, the devices mentioned above are collectively referred to as terminal devices. There are usually a plurality of terminal devices 10. One or more terminal device 10 may be distributed in a cell managed by each access network device 20. In the embodiments of the disclosure, the terminal device is a multi-card terminal. Any SIM card in the terminal device corresponds to one logical terminal device.

Steps performed by the terminal device may be understood as being performed by one logical terminal device corresponding to the terminal device.

The access network device 20 is a device that is deployed in the access network and is configured to provide a wireless communication function for the terminal device 10. The access network device 20 may include various forms of macro base stations, micro base stations, relay nodes, access points, and the like. In systems using different radio access technologies, devices having a function of an access network device may have different names, for example, called gNodeB or gNB in a 5th Generation New Radio (5G NR) system. With the evolution of communication technologies, the name "access network device" may change. In order to facilitate description, in the embodiments of the disclosure, apparatuses that provide a wireless communication function for the terminal device 10 are collectively referred to as access network devices. Optionally, a communication relationship may be established between the terminal device 10 and the core network device 30 through the access network device 20. Exemplarily, in a Long Term Evolution (LTE) system, the access network device 20 may be an Evolved Universal Terrestrial Radio Access Network (EUTRAN) or one or more eNodeBs in the EUTRAN; and in the 5G NR system, the access network device 20 may be a Radio Access Network (RAN) or one or more gNBs in the RAN. The core network device 30 is a device deployed in a CN. The function of the core network device is mainly to provide user connection, management of users, and complete the bearing of services, and is provided to an interface of an external network as a bearer network. For example, the core network device in the 5G NR system includes devices, such as an Access and Mobility Management Function (AMF), a User Plane Function (UPF), and a Session Management Function (SMF).

In the embodiments of the disclosure, the network device may refer to the access network device 20, such as a base station, to a core network device 30.

In an example, the access network device 20 and the core network device 30 communicate with each by using a certain interface technology, such as an NG interface in the 5G NR system. The access network device 20 and the terminal device 10 communicate with each other by using a certain air interface technology, such as a Uu interface.

The "5G NR system" in the embodiments of the disclosure may also be referred to as a 5G system or an NR system. However, those skilled in the art can understand its meaning. The technical solutions described in the embodiments of the disclosure may be applied to an LTE system, a 5G NR system, a subsequent evolution system of the 5G NR system, or other communication systems such as a Narrow Band Internet of Things (NB-IoT) system, which will not be limited in the embodiments of the disclosure.

Before introducing the technical solutions of the disclosure, some background technical knowledge involved in the disclosure is introduced first.

The main application scenarios of the 5G NR system include an enhanced Mobile Broadband (eMBB), Ultra Reliable Low Latency Communication (URLLC), and massive Machine Type Communication (mMTC).

The nMBB still takes a user acquiring multimedia content, service, and data as an objective, and its demand is growing rapidly. In another aspect, since the eMBB may be deployed in different scenarios, such as indoor, urban, and rural, and there are significant differences in its capabilities and demands, it cannot be generalized and must be analyzed in detail in combination with specific deployment scenarios.

Typical applications of the URLLC include industrial automation, power automation, remote medical operations (surgeries), traffic safety assurance, and the like. Typical characteristics of the mMTC include high connection density, small data volume, delay insensitive services, low cost of modules, long service life, and the like.

In a 5G NR network environment, for the purposes of reducing air interface signaling overhead, rapidly restoring wireless connection, and rapidly restoring data services, a new Radio Resource Control (RRC) state, namely RRC, an RRC_INACTIVE (also referred to as an RRC inactive state) is defined. This state is different from an RRC_IDLE state (also referred to as an RRC idle state) and an RRC_ACTIVE (also referred to as an RRC CONNECTED state).

In an RRC-IDLE state, mobility is cell reselection based on the UE, paging is initiated by a CN, and a paging area is configured by the CN. There is no UE Access Stratum (AS) context on a base station side. Moreover, there is not RRC connection.

In the RRC_CONNECTED state, there is an RRC connection, and there is UE AS context between the base station and the UE. A network side knows that a location of the UE is a specific cell level. The mobility is the mobility of controlled by the network side. Unicast data may be transmitted between the UE and the base station.

In the RRC_INACTIVE state, the mobility is cell reselection based on the UE, there is a connection between the core network and the NR, the UE AS context exists on a certain base station, paging is triggered by a Radio Access Network (RAN), an RAN-based paging area is managed by the RAN, and the network device knows that the location of the UE is an RAN-based paging area level.

A UE context is introduced and described below.

The UE context includes: a core network context and an access network context.

The core network context is the UE context maintained at the CN. The core network will generate a core network context for a terminal device as long as the terminal long completes registration on the CN. For terminal devices in different RRC states, the content of the core network contexts maintained by the core network is slightly different: for the terminal device in an idle state, the core network context maintained by the core network includes: a core network temporary identity (such as a 5G-S-Temporary Mobile Subscriber Identity (TMSI)), a Non-Access Stratum (NAS) security related configuration, a Registration Area (RA) configuration, and a terminal NAS capability related configuration; for a terminal in an inactive or connected state, the core network context maintained by the core network not only includes: the core network temporary identity (such as the 5G-S-TMSI), the NAS security related configuration, the RA configuration, and the terminal NAS capability related configuration, but also includes information such as channel address related configuration established between the AMF and the access network for the terminal device.

The access network context is the UE context maintained at the access network. For the terminal in an inactive state or a connected state, the access network side also stores the UE context of the terminal device, that is, the access network context. Different from the content of the core network context stored in the CN, the access network context stored in the access network mainly includes resource configuration information related to an access network air interface, such as an AS security related configuration, an RRC/Layer 2 (L2)/Layer 1 (L1) related resource configuration, a session management related configuration, and a terminal AS capability related configuration.

A multi-card terminal is introduced and described below.

Dual-SIM dual standby refers to that two SIM cards from different operator networks are simultaneously inserted into a mobile phone and are enabled to be in a standby state. A user can make and answer calls, or send and receive text messages without switching networks.

The terminal device that supports the dual-SIM dual standby as described above is a dual-card terminal. The present terminal capabilities generally do not support pure dual communication, that is, Dual Uplink/Downlink (UL/DL), which means that the terminal device simultaneously performs both uplink and downlink data services on two networks through two SIM cards. Generally, most present terminal devices only support Single UL/DL or Single UL/Dual DL, which means that the terminal devices can only perform service on one Universal Subscriber Identity Module (USIM) card at a certain moment.

In 5G, for two SIM cards of the dual-card terminal, one of which may reside in an LTE cell, the other resides in an NR cell, or both SIM cards reside in the NR cell. Meanwhile, these two SIM cards may be the same operator or different operators.

The concept of a multi-card terminal is similar to the logic of the dual-card terminal described above, which will not be elaborated herein. One SIM card may be understood as corresponding to one logical terminal device, and the multi-card terminal can be considered as having plurality of logical terminal devices running on the same hardware resource. In addition, each logical terminal device corresponds to one UE context.

As introduced above, when the multi-card terminal, that is, a behavior of inserting a plurality of cards into one mobile phone being considered as a terminal product implementation, performs communication tasks such as registration, cell measurement, and cell system information acquisition, and the like, the task behaviors among a plurality of SIM cards of the same mobile phone are performed relatively independent. However, in fact, the hardware resource of the same mobile phone is shared among different cards of the same mobile phone, and the results required for many tasks among different SIM cards are actually similar, so it is unfavorable to saving electricity by independently performing task processing by different SIM cards of one mobile phone.

In order to solve the above problems, according to the technical solutions of the disclosure, in a case that the terminal device is a multi-card terminal, the terminal device transmits the first message carrying the collaborative operation related information to the network device, thereby negotiating with the network device to use a plurality of SIM cards to perform collaborative operation. Due to similar data required for some tasks among the plurality of SIM cards, communication with the network device can be reduced by performing the collaborative operation by using the plurality of SIM cards, which is beneficial for saving electricity of the terminal device.

The technical solutions of the disclosure are introduced and described below by several embodiments.

Figure 2:
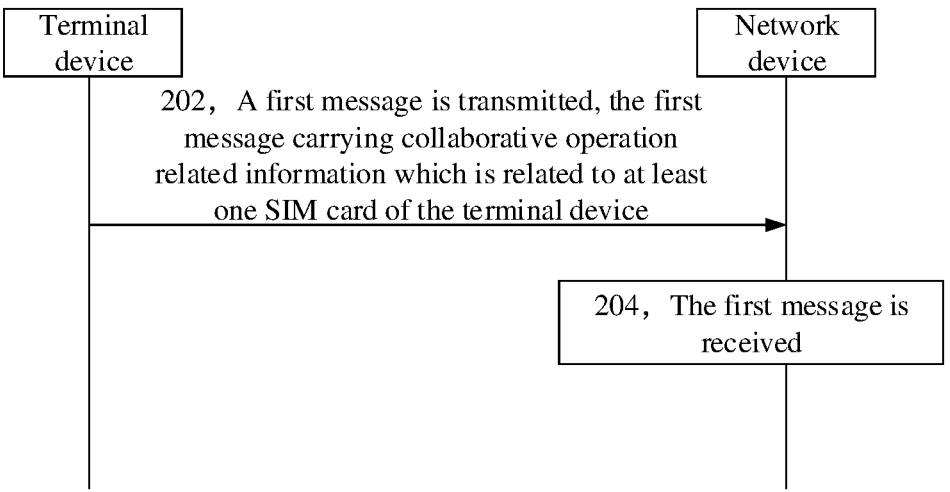
FIG. 2 is a flowchart of a communication method provided by one embodiment of the disclosure.

Refer to FIG. 2, which is a flowchart of a communication method provided by one embodiment of the disclosure. The method is applied to network architecture shown in FIG. 1. The method may include the following steps (202 to 204).

At S202, a terminal device transmits a first message to a network device, the first message carrying collaborative operation related information which is related to at least one SIM card of the terminal device.

In the embodiments of the disclosure, the terminal device is a multi-card terminal, that is, the terminal device supports inserting at least two SIM cards and enables them to be in a standby state simultaneously. A user may use any SIM card to perform task processing. The plurality of SIM cards may correspond to the same operator or different operators, which will not be limited in the embodiments of the disclosure.

Any SIM card inserted into the terminal device corresponds to one logical terminal device running on a hardware resource corresponding to the terminal device. In the embodiments of the disclosure, the terminal device transmits the first message carrying the collaborative operation related information to the network device, which may be that one logical terminal device in the terminal device transmits the first message carrying the collaborative operation related information to the network device, or a plurality of logical terminal devices in the terminal device respectively transmit the first message carrying the collaborative operation related information to the network device.

The collaborative operation related information is used for negotiating a collaborative operation item between the terminal device and the network device. The collaborative operation item refers to that the terminal device uses at least two SIM cards of n SIM cards to perform collaborative operation. That is, in a case that the n SIM cards are inserted into the terminal device, and there are n logical terminal devices in total, the terminal device may negotiate with the network device, and finally negotiate to use m SIM cards to perform collaborative operation, and m is a positive integer not less than 2 and not greater than n.

Exemplarily, the terminal device is a dual-card terminal, and the SIM cards inserted into the terminal device include: SIM card 1 and SIM card 2. SIM card 1 corresponds to a first logical terminal device, and SIM card 2 corresponds to a second logical terminal device. The first logical terminal device transmits the first message to the network device. The collaborative operation related information in the first message is used for negotiating with the network device to obtain that: the terminal device uses SIM card 1 and SIM card 2 to perform collaborative operation.

Exemplarily, the terminal device is a three-card terminal, and the SIM cards inserted into the terminal device include: SIM card 1, SIM card 2, and SIM card 3. SIM card 1 corresponds to a first logical terminal device, SIM card 2 corresponds to a second logical terminal device, and SIM card 3 corresponds to a third logical terminal device. All of the first logical terminal device, the second logical terminal device, and the third logical terminal device transmit the collaborative operation related information to the network device for negotiating with the network device to obtain that: the terminal device uses SIM card 1, SIM card 2, and SIM card 3 to perform collaborative operation.

At least two SIM cards performing collaborative operation may be understood as: when any one of the at least two SIM cards performs a task, task processing may be performed by refer they can referencing to data, related to the task, of other SIM cards. Specific description will be given in the following embodiments.

At S204, the network device receives the first message.

The first message carries the collaborative operation related information which is related to at least one SIM card of the terminal device.

Optionally, the network device is any one of an access network device or a core network device. That is, the terminal device may negotiate the collaborative operation item with the access network device, or may negotiate the collaborative operation item with the core network device.

In a case that the network device is the core network device, the first message is a message carried in NAS signaling.

Optionally, after receiving the first message, the network device will feed back a response message to the terminal device. The response message is used for configuring the collaborative operation among a plurality of cards of the terminal device.

Optionally, after receiving the first message, the network device will update an UE context corresponding to the terminal device. The UE context is an access network context or a core network context.

In conclusion, according to the technical solutions provided by the embodiments of the disclosure, in a case that the terminal device is a multi-card terminal, the terminal device transmits the first message carrying the collaborative operation related information to the network device, thereby negotiating with the network device to use a plurality of SIM cards to perform collaborative operation. Due to similar data required for some tasks among the plurality of SIM cards, communication with the network device can be reduced by performing the collaborative operation by using the plurality of SIM cards, which is beneficial for saving electricity of the terminal device.

In conclusion, according to the technical solutions of the disclosure, the terminal device is a multi-card terminal, and any SIM card in the terminal device may be considered as a logical terminal device running on the hardware resource corresponding to the terminal device. The interaction between any logical terminal device on the same hardware resource and the network device (such as the access network device and the core network device) may be understood as the interaction between a specific terminal device corresponding to the hardware resource and the network device.

Exemplarily, SIM card 1 and SIM card 2 are inserted into the terminal device. The communication between logical terminal device 1 corresponding to SIM card 1 and the network device may be considered as the communication between the terminal device and the network device, and the communication between logical terminal device 2 corresponding to SIM card 2 and the network device may also be considered as the communication between the terminal device and the network device.

In the following embodiments, the technical solutions of the disclosure are exemplarily described by taking an example in which a logical terminal device (recorded as the first logical terminal device) communicates with the network device.

The first logical terminal device corresponds to the first SIM card inserted into the terminal device. The first logical terminal transmits the first message to the network device. The first message carries the collaborative operation related information. There are n SIM cards, including the first SIM card, running on the hardware resource corresponding to the first logical terminal device. The n SIM cards are in one-to-one correspondence with n logical terminal devices, and n is a positive integer not less than 2.

The collaborative operation related information is used for negotiating a collaborative operation item between the first logical terminal device and the network device. The collaborative operation item refers to that the hardware resource corresponding to the first logical terminal device uses at least two SIM cards of the n SIM cards to perform collaborative operation. That is, in a case that the n SIM cards are inserted into the terminal device, and there are n logical terminal devices in total, the first logical terminal device may negotiate with the network device, and finally negotiate to use m SIM cards to perform collaborative operation, and m is a positive integer not less than 2 and not greater than n.

A first logical terminal device negotiates collaborative operation with an access network device.

In a schematic embodiment, the first logical terminal device negotiates a collaborative operation item with the access network device through one round trip of interaction: the first logical terminal device transmits the first message to the access network device, and the access network device feeds back a first response message to the first logical terminal device.

Figure 3:
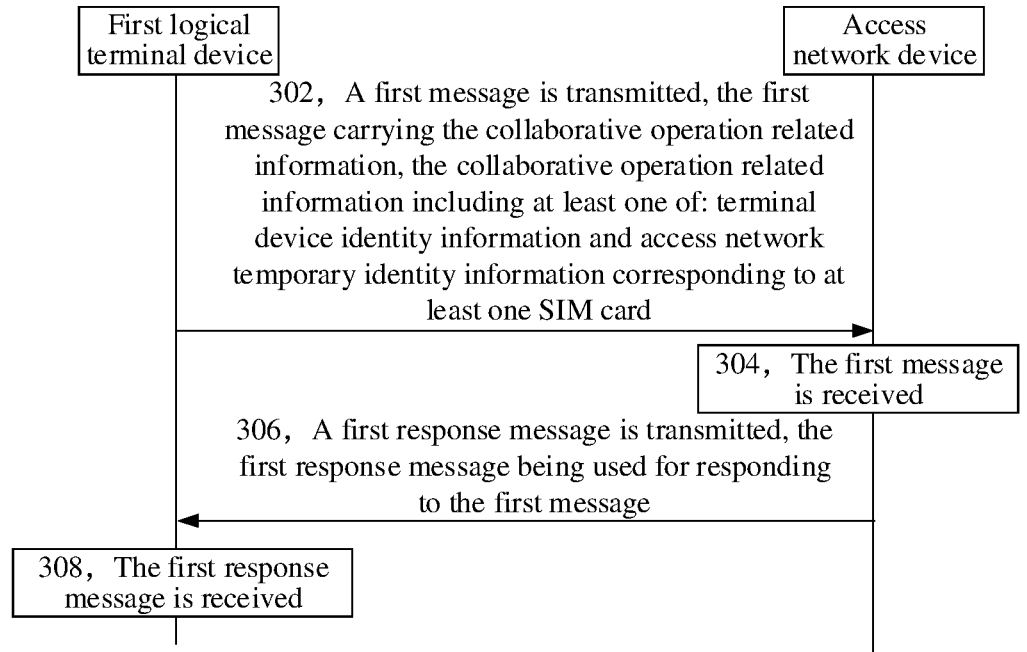
FIG. 3 is a flowchart of a communication method provided by another embodiment of the disclosure.

Refer to FIG. 3, which is a flowchart of a communication method provided by another embodiment of the disclosure. The method may be applied to network architecture shown in FIG. 1. The method may include the following steps (302 to 308).

At S302, the first logical terminal device transmits the first message to the access network device, the first message carrying the collaborative operation related information, and the collaborative operation related information including at least one of: terminal device identity information or access network temporary identity information corresponding to at least one SIM card.

In this embodiment, the collaborative operation related information at least includes: the terminal device identity information, and/or, the access network temporary identity information corresponding to the at least one SIM card.

The terminal device identity information is used for identifying a hardware resource corresponding to the first logical terminal device. Optionally, the terminal device identity information is a Permanent Equipment Identifier (PEI) when the hardware resource corresponding to the first logical terminal device leaves a factory, or identity information derived according to the PEI.

The access network temporary identity information is used for identifying an access network context associated with a logical terminal device corresponding to a SIM card in an access network. The access network temporary identity information is a Cell-Radio Network Temporary Identity (C-RNTI); or an Inactive-Radio Network Temporary Identity (I-RNTI).

Exemplarily, the terminal device has n SIM cards in total, including the first SIM card corresponding to the first logical terminal device. The collaborative operation related information transmitted by the first logical terminal device to the access network device includes: access network temporary identity information corresponding to the n SIM cards, the access network device may configure m SIM cards of the n SIM cards to perform collaborative operation, n is a positive integer not less than 2, and m is a positive integer not greater than n.

Exemplarily, the terminal device has n SIM cards in total, including the first SIM card corresponding to the first logical terminal device. The collaborative operation related information transmitted by the first logical terminal device to the access network device includes: the terminal device identity information and the access network temporary identity information corresponding to the first SIM card. In a case that other logical terminal devices also transmit the terminal device identity information and the access network temporary identity information corresponding to the SIM cards thereof to the access network device, the access network device may configure to use the corresponding SIM card to perform collaborative operation for the plurality of logical terminal devices corresponding to the same terminal device identity information.

Optionally, the collaborative operation related information further includes at least one of: collaborative operation request information, or collaborative operation request auxiliary information. The collaborative operation request information is used for requesting, from the access network device, the hardware resource corresponding to the first logical terminal device to use at least two SIM cards of the n SIM cards to perform collaborative operation, and the collaborative operation request auxiliary information is used for providing operation content information of the at least one SIM card that is used by the hardware resource corresponding to the first logical terminal device and participates in the collaborative operation for the access network device.

It is to be understood that the SIM cards carried by the first logical terminal device in collaborative operation related information may not necessarily be at least two SIM cards of the n SIM cards configured after final negotiation with an access network device side. Exemplarily, the first logical terminal device carries the following SIM cards in the collaborative operation related information include: SIM card 1, SIM card 2, and SIM card 3, and finally negotiates with the access network device to obtain: using SIM card 1 and SIM card 3 to perform collaborative operation.

In a possible implementation, the function of the collaborative operation request information is implicitly represented by the presence of the terminal device identity information, and/or, the access network temporary identity information corresponding to the at least one SIM card. Exemplarily, in a case that the first message includes the terminal device identity information, and/or, the access network temporary identity information corresponding to the at least one SIM card, it indicates that the first logical terminal device requests, from the access network device, the hardware resource corresponding to the first logical terminal device to use at least two SIM cards to perform collaborative operation.

Optionally, the collaborative operation request auxiliary information includes at least one of the following information.

Card identity information of at least one SIM card participating in the collaborative operation The card identity information is configured to indicate a logical identity of the SIM card in the same hardware resource.

Exemplarily, three SIM cards are inserted into the same terminal device, and then the three SIM cards above may be respectively identified by using numbers 0, 1, and 2.

Operator information supported by at least one SIM card participating in the collaborative operation The operator information is configured to indicate a network identity of an operator corresponding to the SIM card.

Exemplarily, SIM card 1 belongs to operator 1, SIM card 2 belongs to operator 2, and SIM card 3 belongs to operator 3. The first logical terminal device may report the network identity of the operator supported by the at least one SIM card to the access network device in a form of a list according to a logical identity order of the SIM cards. For example, the first logical terminal device reports list information as {network identity 1, network identity 2, and network identity 3}, network identity 1 corresponds to SIM card 1, network identity 2 corresponds to SIM card 2, and network identity 3 corresponds to SIM card 3. Refer to the following Table 1 for specific details.

TABLE 1

Schematic diagram of reporting format of operator information supported by at least one SIM card participating in collaborative operation Operator information supported by at least one SIM card participating in collaborative operation

| SIM card 1 | SIM card 2 | . . . | SIM card N |
|---|---|---|---|
| Network identity 1 | Network identity 2 | . . . | Network identity N |

Task type scope information participating in collaborative operation

The task type scope information is configured to indicate at least one task type.

Optionally, the task type scope information participating in the collaborative operation is reported according to the granularity of the terminal device, or according to the granularity of the card identity.

Reporting form 1: reporting according to the granularity of the terminal device

TABLE 2

Schematic diagram of reporting task type scope information according to granularity of terminal device Task type scope information

| Task type 1 | Task type 2 | . . . | Task type N |
|---|---|---|---|

As shown in Table 2 above, task type reporting does not distinguish card identity, so the task type range information is reported according to the granularity of the terminal device.

Reporting form 2: reporting according to the granularity of the card identity:

TABLE 3

Schematic diagram of reporting task type scope information according to granularity of card identity Task type scope information

| Card identity of SIM card 1 | Card identity of SIM card 2 | . . . | Card identity of SIM card N |
|---|---|---|---|
| Task information 1 | Task information 2 | . . . | Task information N |

Optionally, the task information corresponding to the card identity of the SIM card is reported in a form of a task type identity information list, or in a form of bit mapping information corresponding to a task type.

Exemplarily, the task information 1 reported by the first logical terminal device is a piece of list information: {network identity 1, network identity 2, and network identity 3}, which indicates that the first logical terminal device requests: for the task type 1, the task type 2, and the task type 3, the collaborative operation may be performed between SIM card 1 and other SIM cards. Exemplarily, the task information 1 reported by the first logical terminal device is a piece of bit mapping information, and each bit in the bit mapping information corresponds to one task type. If the ith bit corresponds to task type i, and the task information 1 is bit mapping information '1010', it indicates that the first logical terminal device requests: for task type 1 and task type 3, collaborative operation may be performed between SIM card 1 and other SIM cards. It is to be understood that this is an exemplary description, and the disclosure does not limit a case with an opposite meaning of a bit value.

As shown in Table 3 above, the task type range information is reported according to the granularity of a card. A correspondence between at least one of task information and the card identity may be explicit or implicit, and the correspondence between the two is predefined by a communication protocol in an implicit manner.

Optionally, before S302, the first logical terminal device needs to determine whether it is allowed to initiate negotiation of a collaborative operation item. S302 is performed only after determining that it is allowed to initiate the negotiation of the collaborative operation item.

In a possible implementation, the first logical terminal device determines whether it is allowed to initiate the negotiation of the collaborative operation item based on an indication of the network device.

Exemplarily, the access network device transmits fourth indication information for the first logical terminal device. The fourth indication information is configured to indicate whether the first logical terminal device is allowed to initiate the negotiation of the collaborative operation item. Correspondingly, the first logical terminal device receives the fourth indication information sent by the access network device. The fourth indication information is carried in a system broadcast message; or, the fourth indication information is carried in dedicated signaling.

Exemplarily, the core network device transmits the fourth indication information to the first logical terminal device. The fourth indication information is configured to indicate whether the first logical terminal device is allowed to initiate negotiation of the collaborative operation item. Correspondingly, the first logical terminal device receives the fourth indication information transmitted by the core network device. The fourth indication information is carried in NAS signaling, and at this moment, the first logical terminal device, after receiving the fourth indication information, also transmits the fourth indication information to an AS.

In another possible implementation, the first logical terminal device determines whether it is allowed to initiate the negotiation of the collaborative operation item based on capability information supported by the same.

At S304, the access network device receives the first message.

At S306, the access network device transmits a first response message to the first logical terminal device, the first response message being configured to respond to the first message.

Optionally, the first response message carries the first indication information. The first indication information is configured to indicate the access network device whether to accept the collaborative operation item.

Optionally, in response to the first indication information indicating the access network device to accept the collaborative operation item, the first response message carries application scope configuration information. The disclosure scope configuration information is configured to indicate a related configuration participating in the collaborative operation.

In a possible implementation, the function of the first indication information is implicitly represented by the presence of the disclosure scope configuration information. Exemplarily, when the first response message carries the disclosure scope configuration information, it indicates that the access network device accepts the collaborative operation item initiated by the first logical terminal device; otherwise, when the first response message does not carry the disclosure scope configuration information, it indicates that the access network device does not accept the collaborative operation item initiated by the first logical terminal device.

In the embodiments of the disclosure, the access network device may transmit the first response message to logical terminal devices associated with the collaborative operation item separately, or may only transmit the first response message to the first logical terminal device. The first logical terminal device notifies content of the first response message to other logical terminal devices associated with the collaborative operation item in an internal notification manner. The logical terminal devices associated with collaborative operation item include: the logical terminal devices respectively corresponding to the SIM cards that are configured on an access network device side and participate in the collaborative operation; or, the logical terminal devices that request to participate in the collaborative operation from the access network device side.

Optionally, related configuration participating in the collaborative operation includes at least one of the following configurations.

Access network temporary identity information corresponding to the at least one SIM card participating in the collaborative operation.

The access network temporary identity information is used for identifying an access network context associated with a logical terminal device corresponding to the SIM card in the access network. The access network temporary identity information is C-RNTI or I-RNTI.

Exemplarily, the first logical terminal device corresponds to SIM card 1, and the access network device returns to the first logical terminal device: the access network temporary identity information corresponding to SIM card 2, which indicates that SIM card 1 and SIM card 2 may operation collaboratively.

Exemplarily, the first logical terminal device corresponds to SIM card 1, and the access network device returns to the first logical terminal device: the access network temporary identity information corresponding to SIM card 1 and the access network temporary identity information corresponding to SIM card 2, which indicates that SIM card 1 and SIM card 2 may operation collaboratively.

Card identity information of at least one SIM card participating in the collaborative operation.

The card identity information is configured to indicate a logical identity of the SIM card in the same hardware resource.

Exemplarily, three SIM cards are inserted into the same terminal device, and then the three SIM cards above may be respectively identified by using numbers 0, 1, and 2. Exemplarily, the access network device returns to the first logical terminal device: number 0 and number 1, which indicates that SIM card 1 and SIM card 2 may operation collaboratively. Exemplarily, the access network device returns to the first logical terminal device: number 1, which indicates that SIM card 1 and SIM card 2 may operation collaboratively.

In a possible implementation, the card identity information supports performing bit mapping to obtain bit mapping information. Each bit in the bit mapping information corresponds to one SIM card, and corresponding rules are specified by a protocol, for example, a first bit corresponds to SIM card 1, a second bit corresponds to SIM card 2, and so on. Taking the bit mapping information occupying 4 bits as an example, assuming that the access network device returns '1010', then it indicates that SIM card 1 and SIM card 3 may operation collaboratively. It is to be understood that this is an exemplary description, and the disclosure does not limit a case with an opposite meaning of a bit value.

At least one task type configuration participating in the collaborative operation.

The at least one task type configuration may be issued in a form of a task type identity information list, or in a form of bit mapping information corresponding to a task type.

Exemplarily, the at least one task type configuration is a piece of list information: {task type 1, task type 2, and task type 3}, which indicates that the collaborative operation may be performed for task type 1, task type 2, and task type 3.

Exemplarily, taking the at least one task type configuration being represented by the bit mapping information as an example for description, each bit in the bit mapping information corresponds to one task type, and corresponding rules are specified by a protocol, for example, a first bit corresponds to task type 1, a second bit corresponds to task type 2, and so on. Taking the bit mapping information occupying 5 bits as an example, assuming that the access network device returns '10100', then it indicates that task type 1 and task type 3 may operation collaboratively. It is to be understood that this is an exemplary description, and the disclosure does not limit a case with an opposite meaning of a bit value.

At S308, the first logical terminal device receives the first response message.

In conclusion, according to the technical solutions provided by the embodiments of the disclosure, the first logical terminal device negotiates the collaborative operation item with the access network device through one round trip of interaction: the first logical terminal device transmits the first message to the access network device, and the access network device feeds back the first response message to the first logical terminal device. Interactions are few, which improves the configuration efficiency of multi-card collaborative operation.

In a schematic embodiment, the first logical terminal device negotiates the collaborative operation item with the access network device through two round trips of interaction: the first logical terminal device transmits the first message to the access network device, and the access network device feeds back a second response message to the first logical terminal device; and the first logical terminal device transmits a second message to the access network device, and the access network device feeds back a third response message to the first logical terminal device.

Figure 4:
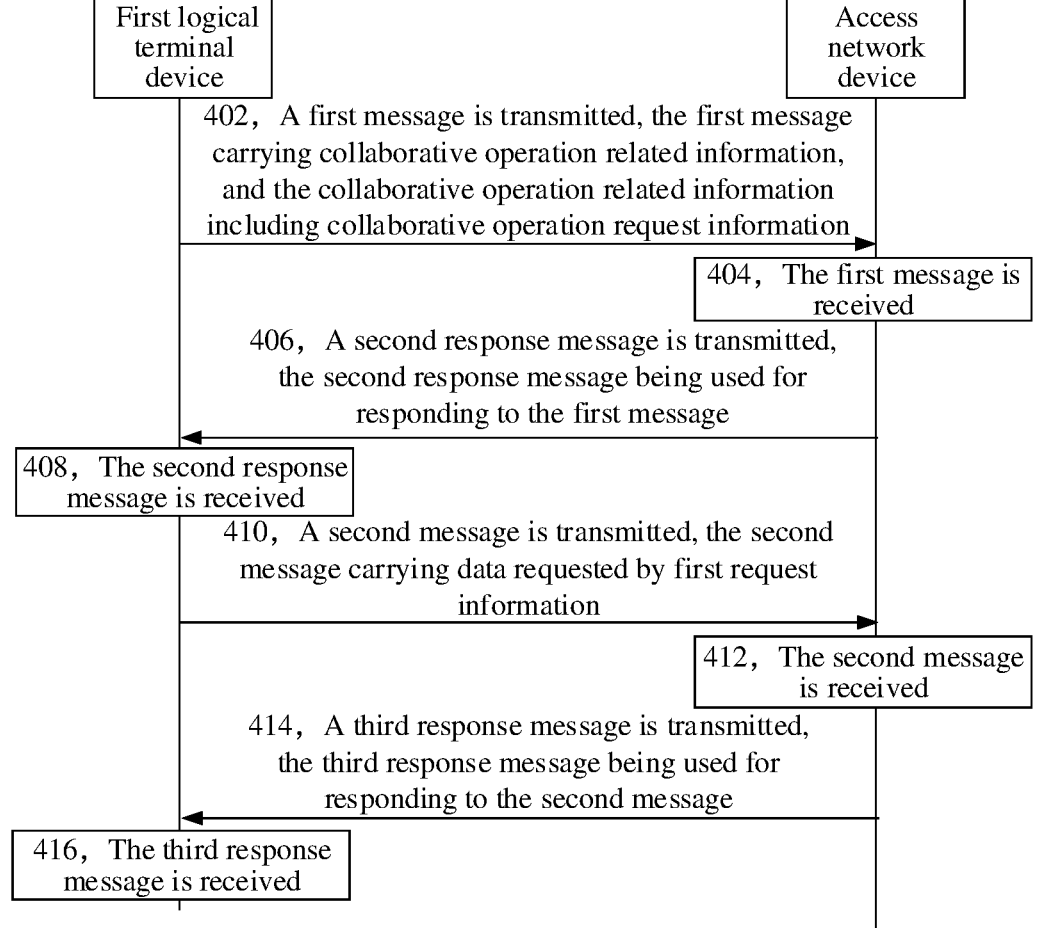
FIG. 4 is a flowchart of a communication method provided by another embodiment of the disclosure.

Refer to FIG. 4, which is a flowchart of a communication method provided by another embodiment of the disclosure. The method may be applied to network architecture shown in FIG. 1. The method may include the following steps (402 to 416).

At S402, the first logical terminal device transmits a first message to an access network device, the first message carrying the collaborative operation related information, and the collaborative operation related information including collaborative operation request information.

In this embodiment, the collaborative operation related information at least includes: collaborative operation request information.

The collaborative operation request information is used for requesting, from the access network device, the hardware resource corresponding to the first logical terminal device to use at least two SIM cards of the n SIM cards to perform collaborative operation.

Optionally, before S402, the first logical terminal device needs to determine whether it is allowed to initiate negotiation of the collaborative operation item. Step 402 is performed only after determining that it is allowed to initiate the negotiation of the collaborative operation item.

In a possible implementation, the first logical terminal device determines whether it is allowed to initiate the negotiation of the collaborative operation item based on an indication of the network device.

Exemplarily, the access network device transmits fourth indication information for the first logical terminal device. The fourth indication information is configured to indicate whether the first logical terminal device is allowed to initiate the negotiation of the collaborative operation item. Correspondingly, the first logical terminal device receives the fourth indication information sent by the access network device. The fourth indication information is carried in a system broadcast message; or, the fourth indication information is carried in dedicated signaling.

Exemplarily, a core network device transmits the fourth indication information to the first logical terminal device. The fourth indication information is configured to indicate whether the first logical terminal device is allowed to initiate negotiation of the collaborative operation item. Correspondingly, the first logical terminal device receives the fourth indication information transmitted by the core network device. The fourth indication information is carried in NAS signaling, and at this moment, the first logical terminal device, after receiving the fourth indication information, also transmits the fourth indication information to an AS.

In another possible implementation, the first logical terminal device determines whether it is allowed to initiate the negotiation of the collaborative operation item based on capability information supported by the same.

At S404, the access network device receives the first message.

At S406, the access network device transmits a second response message to the first logical terminal device, the second response message being configured to respond to the first message.

Optionally, the second response message carries at least one of: second indication information or first request information.

The second indication information is configured to indicate the access network device whether to accept the collaborative operation item, and the first request information is used for requesting the terminal device to report at least one of: terminal device identity information, which is used for identifying a hardware resource corresponding to the first logical terminal device; or access network temporary identity information corresponding to at least one SIM card.

In a possible implementation, the function of the second indication information is implicitly represented by the presence of the first request information. Exemplarily, when the second response message carries the first request information, it indicates that the access network device accepts the collaborative operation item initiated by the first logical terminal device; otherwise, when the second response message does not carry the first request information, it indicates that the access network device does not accept the collaborative operation item initiated by the first logical terminal device.

The terminal device identity information is used for identifying a hardware resource corresponding to the first logical terminal device. Optionally, the terminal device identity information is a PEI when the hardware resource corresponding to the first logical terminal device leaves a factory, or identity information derived according to the PEI.

The access network temporary identity information is used for identifying an access network context associated with a logical terminal device corresponding to a SIM card in an access network. The access network temporary identity information is C-RNTI or I-RNTI.

Optionally, the first request information is also used for requesting the first logical terminal device to report collaborative operation request auxiliary information. The collaborative operation request auxiliary information is used for providing operation content information of the at least one SIM card that is used by the hardware resource corresponding to the first logical terminal device and participates in the collaborative operation for the access network device.

Optionally, the collaborative operation request auxiliary information includes at least one of the following information.

Card identity information of at least one SIM card participating in the collaborative operation Operator information supported by at least one SIM card participating in the collaborative operation Task type scope information participating in collaborative operation For specific implementation forms of the three types of information above, refer to the above embodiments, which will not be elaborated herein.

At S408, the first logical terminal device receives the second response message.

It is to be understood that, if the second response message includes the second indication information, and the second indication information indicates that the access network device does not accept the collaborative operation item, then the following steps 410 to 416 will not be continued to be performed.

At S410, the first logical terminal device transmits a second message to the access network device, the second message carrying data requested by the first request information.

Exemplarily, based on a request in the first request information, the second message carries at least one of: terminal device identity information, which is used for identifying a hardware resource corresponding to the first logical terminal device; access network temporary identity information corresponding to at least one SIM card; or collaborative operation request auxiliary information, which is used for providing operation content information of the at least one SIM card that is used by the hardware resource corresponding to the first logical terminal device and participates in the collaborative operation for the access network device.

At S412, the access network device receives the second message.

At S414, the access network device transmits a third response message to the first logical terminal device, the third response message being configured to respond to the second message.

Optionally, the third response message carries at least one of: third indication information and application scope configuration information. The third indication information is configured to indicate whether the access network device accepts the collaborative operation item. The disclosure scope configuration information is configured to indicate a related configuration participating in the collaborative operation.

In a possible implementation, the function of the third indication information is implicitly represented by the presence of the disclosure scope configuration information. Exemplarily, when the third response message carries the disclosure scope configuration information, it indicates that the access network device accepts the collaborative operation item initiated by the first logical terminal device;

otherwise, when the third response message does not carry the disclosure scope configuration information, it indicates that the access network device does not accept the collaborative operation item initiated by the first logical terminal device.

In the embodiments of the disclosure, the access network device may transmit the third response message to logical terminal devices associated with the collaborative operation item separately, or may only transmit the third response message to the first logical terminal device. The first logical terminal device notifies content of the third response message to other logical terminal devices associated with the collaborative operation item in an internal notification manner. The logical terminal devices associated with collaborative operation item include: the logical terminal devices respectively corresponding to the SIM cards that are configured on an access network device side and participate in the collaborative operation; or, the logical terminal devices that request to participate in the collaborative operation from the access network device side.

It is to be understood that in a case that the access network device side indicates whether to accept the collaborative operation item in an indication manner of displaying, the access network device may indicate whether to accept the collaborative operation item through the second indication information in S406 above, or whether to accept the collaborative operation item through the third indication information in S414 above.

Optionally, related configuration participating in the collaborative operation includes at least one of the following configurations.

Access network temporary identity information corresponding to the at least one SIM card participating in the collaborative operation The access network temporary identity information is C-RNTI or I-RNTI.

Card identity information of at least one SIM card participating in the collaborative operation At least one task type configuration participating in the collaborative operation For specific implementation forms of the three configurations above, refer to the above embodiments, which will not be elaborated herein.

At S416, the first logical terminal device receives the third response message.

In conclusion, according to the technical solution provided by the embodiments of the disclosure, the first logical terminal device negotiates the collaborative operation item with the access network device through two round trips of interaction: the first logical terminal device transmits the first message to the access network device, and the access network device feeds back the second response message to the first logical terminal device; and the first logical terminal device transmits the second message to the access network device, and the access network device feeds back the third response message to the first logical terminal device. Through the above interaction, the first logical terminal device reports the message to the access network twice, which is beneficial for the first logical terminal device to stop reporting the collaborative operation related information in time in a case that the access network device side does not accept the collaborative operation item.

In a schematic embodiment, the first logical terminal device will enable a multi-card collaborative operation mode to perform collaborative operation after confirming that the access network device accepts the collaborative operation initiated by the first logical terminal device, that is, completing a negotiation with the access network device.

Refer to FIG. 5, which is a flowchart of a communication method provided by another embodiment of the disclosure. The method may be applied to network architecture shown in FIG. 1. The method may include the following step.

At S502: a multi-card collaborative operation mode is enabled in response to a successful negotiation of a collaborative operation item.

The multi-card collaborative operation mode allows a target logical terminal device participating in the collaborative operation to check related data of a preset task corresponding to other SIM cards except the SIM card corresponding to the target logical terminal device in the at least two SIM cards participating in the collaborative operation first before performing the preset task, or allows the target logical terminal device participating in the collaborative operation to transmit the related data of the preset task to a logical terminal device corresponding to the other SIM cards except the SIM card corresponding to the target logical terminal device in the at least two SIM cards participating in the collaborative operation after the target logical terminal device participating in the collaborative operation completes the preset task.

In a possible implementation, the multi-card collaborative operation mode only allows the first logical terminal device that initiates the collaborative operation item to check the related data of the preset task corresponding to the other SIM cards except the first SIM card participating in the collaborative operation first before performing the preset task, or allows the first logical terminal device participating in the collaborative operation to transmit the related data of the preset task to the logical terminal device corresponding to the other SIM cards except the first SIM card participating in the collaborative operation for use after completing preset task.

In another possible implementation, the multi-card collaborative operation mode allows any first logical terminal device participating in the collaborative operation to check related data of a preset task corresponding to other SIM cards participating in the collaborative operation first before performing the preset task, or allows the any first logical terminal device participating in the collaborative operation to transmit the related data of the preset task to the logical terminal device corresponding to the other SIM cards participating in the collaborative operation for use after completing preset task.

It is to be understood that the preset task may be determined by the logical terminal device participating in the collaborative operation based on a task type configuration issued by the access network device, or may be predefined in a communication protocol.

Optionally, the preset task includes at least one of: a system information acquisition task, a system information update task, a measurement related task, a paging receiving task, a configuration update task, or a re-registration task. For specific content of the tasks of the above types, refer to related definitions in the communication protocol, which will not be elaborated herein.

Exemplarily, the terminal device first checks system information stored in other SIM cards participating in the collaborative operation before performing the system information update task associated with a certain SIM card. If the system information stored in the other SIM cards has been updated, for example, a system information version is determined through a value tag, then whether the system information has been updated is determined, and the terminal device may directly copy the system information stored in internal memories of the other SIM cards to an internal memory of the SIM card with the system information that needs to be updated through an internal unit of a hardware device without re-receiving corresponding information through a Uu air interface, thereby reducing the energy consumption of the terminal device.

Optionally, the related data of the preset task includes at least one of: configuration data; or start data used for activating the preset task.

Optionally, the related data of the preset task further includes at least one of: data calculated according to the configuration data; or data obtained according to a measurement process.

Exemplarily, the configuration data issued by the access network device includes timing advance, then the target logical terminal device calculates Round Trip Time (RTT) based on the timing advance. The RTT may be considered as the data calculated according to the configuration data.

Exemplarily, the target logical terminal device measures to obtain a cell measurement result based on the measurement configuration issued by the access network device. The cell measurement result may be considered as the data obtained according to the measurement process.

In conclusion, according to the technical solutions provided by this embodiment, the target logical terminal device participating in the collaborative operation checks related data of the preset task corresponding to other SIM cards except the SIM card corresponding to the target logical terminal device in the at least two SIM cards participating in the collaborative operation first before performing the preset task, or the target logical terminal device transmits the related data of the preset task to the logical terminal device corresponding to the other SIM cards except the SIM card corresponding to the target logical terminal device in the at least two SIM cards participating in the collaborative operation after completing the preset task, so as to help reduce the demand for the logical terminal device to request the preset task from a network side, or the demand for the present side to perform corresponding measurement and calculation, thereby helping the hardware resource corresponding to the logical terminal device save electricity.

In an exemplary embodiment, the access network device will establish a first association relationship between access network contexts. When configuration information contained in the access network contexts is established or updated, refer to the configuration information contained in the access network contexts established by other logical terminal devices associated with the first association relationship.

Figure 6:
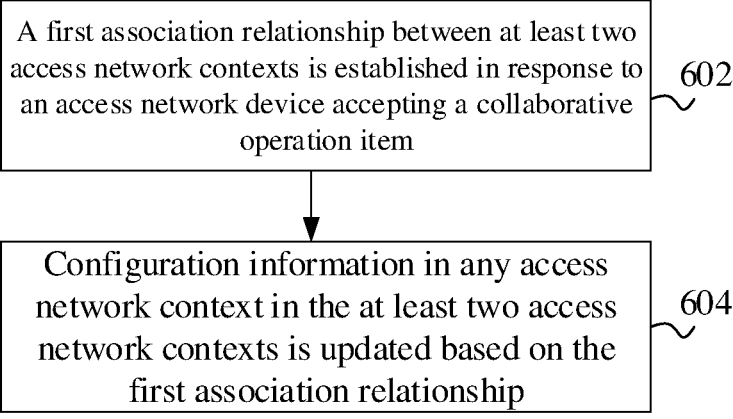
FIG. 6 is a flowchart of a communication method provided by another embodiment of the disclosure.

Refer to FIG. 6, which is a flowchart of a communication method provided by another embodiment of the disclosure. The method may be applied to network architecture shown in FIG. 1. The method may include the following steps (602 to 604).

At S602, a first association relationship between at least two access network contexts is established in response to an access network device accepting a collaborative operation item.

On the access network device side, after accepting the collaborative operation item, the access network device updates the access network context corresponding to the logical terminal device associated with the collaborative operation, and establishes a first association relationship between at least two access network contexts. The logical terminal devices associated with collaborative operation item include: the logical terminal devices respectively corresponding to the SIM cards that are configured on the access network device side and participate in the collaborative operation; or, the logical terminal devices that request to participate in the collaborative operation from the access network device side.

Optionally, the access network device establishes a second association relationship for the access network context corresponding to the logical terminal device, and establishes the first association relationship between at least two access network contexts satisfying a first condition based on the second association relationship. That is, S602 may be alternately implemented as: in response to the at least two access network contexts satisfying the first condition, the access network device establishes a first association relationship between the at least two access network contexts. The first condition is associated with the second association relationship corresponding to the access network context.

Exemplarily, the first logical terminal device and the access network device negotiate a collaborative operation item. The access network device first establishes the second association relationship for the first access network context corresponding to the first logical terminal device, and then establishes the first association relationship between the first access network context and the other access network contexts in the presence of other access network contexts that satisfy the first condition with the first access network context.

The second association relationship is used for representing the association relationship between the access network context and a first logical identity. The first logical identity is at least one of: terminal device identity information, collaborative operation identity information, or an access network temporary identity information set.

The terminal device identity information is used for identifying a hardware resource corresponding to the logical terminal device. Optionally, the terminal device identity information is a PEI when the hardware resource corresponding to the logical terminal device leaves a factory, or identity information derived according to the PEI. In the embodiments of the disclosure, the access network device not only acquires the terminal device identity information through reporting of the logical terminal device, but also acquires the terminal device identity information through an access network context transferring process between access network devices.

The collaborative operation identity information is generated based on the terminal device identity information. In the embodiments of the disclosure, the bits occupied by the collaborative operation identity information are less than those occupied by the terminal device identity information. If the hardware resource corresponding to the logical terminal device is identified by using the collaborative operation identity information instead of the terminal device identity information, on one hand, storage bits may be saved, and on the other hand, a security risk caused by frequently using original terminal device identity information can be avoided.

The access network temporary identity information set includes the access network temporary identity information corresponding to at least one SIM card in the collaborative operation in which the logical terminal device corresponding to the access network context participates. The access network temporary identity information is used for identifying an access network context associated with the logical terminal device corresponding to the SIM card in the access network. Optionally, the access network temporary identity information is C-RNTI or I-RNTI.

TABLE 4

| Schematic diagram of second association relationship | |
|---|---|
| Second association relationship | |
| Access network context | Terminal device identity information or collaborative operation identity information or access network temporary identity information set |

As shown in Table 4 above, the second association relationship associates the terminal device identity information or the cooperative operation identity or the access network temporary identity information set with the access network context corresponding to the logical terminal device, so as to facilitate the access network device to associate a plurality of access network contexts satisfying the first condition together to obtain the first association relationship.

Optionally, the meaning of the first condition includes any one of the following.

The terminal device identity information associated with the second association relationship corresponding to the at least two access network contexts is the same.

The terminal device identity information associated with the second association relationship corresponding to the at least two access network contexts is the same, then the access network device considers that the at least two access network contexts satisfy the first condition, and establishes the first association relationship for them.

The collaborative operation identity information associated with each of the second association relationships respectively corresponding to the at least two access network contexts is the same.

The collaborative operation identity information associated with each of the second association relationships respectively corresponding to the at least two access network contexts is the same, then the access network device considers that the at least two access network contexts satisfy the first condition, and establishes the first association relationship for them.

The access network temporary identity information set associated with the second association relationship corresponding to the target access network includes the access network temporary identity information corresponding to the other access network contexts except the target access network in the at least two access network contexts, and the target access network context is all access network contexts of the at least two access network contexts.

That is, the access network temporary identity information set associated with the second association relationship corresponding to any access network context includes the access network temporary identity information corresponding to the other access network contexts, and then the access network device considers that the access network context and the other access network contexts satisfy the first condition, and establishes the first association relationship for them.

The access network temporary identity information set associated with the second association relationship corresponding to the target access network context includes the access network temporary identity information corresponding to the other access network contexts except the target access network context of the at least two access network contexts, and the target access network context is one access network context that is established with the second association relationship of the at least two access network contexts.

That is, in a case that there is one access network context that is established with the second association relationship, and the access network temporary identity information set associated with the second association relationship corresponding to the access network context includes the access network temporary identity information corresponding to the other access network contexts, then the access network device considers that the access network context and the other access network contexts satisfy the first condition, and establishes the first association relationship for them.

An exemplary description for the meaning of the first condition is given below.

TABLE 5

| Schematic diagram of first association relationship First association relationship | | | |
| --- | --- | --- | --- |
| Second association relationship 1 | | Second association relationship 2 | |
| Access network context 1 | Terminal device identity information 1 or collaborative operation identity information 1 | Access network context 2 | Terminal device identity information 1 or collaborative operation identity information 1 |

As shown in Table 5, access network context 1 and access network context 2 satisfy the first condition, because the terminal device identity information or the collaborative operation identity information associated with access network context 1 and access network context 2 is the same. At this moment, the access network device may consider that there is the first association relationship between access network context 1 and access network context 2. Table 5 is described by taking an example in which the first association relationship is associated with two pieces of access network context information. The number of the pieces of access network context information actually associated with the first association relationship is not limited in the disclosure.

TABLE 6

| Schematic diagram of first association relationship First association relationship | | | |
| --- | --- | --- | --- |
| Second association relationship 1 | | Second association relationship 2 | |
| Access network context 1 | Access network temporary identity information 1 and access network temporary identity information 2 | Access network context 2 | Access network temporary identity information 1 and access network temporary identity information 2 |

As shown in Table 6, access network context 1 and access network context 2 satisfy the first condition, because the access network temporary identity information set associated with access network context 1 includes access network temporary identity information corresponding to access network context 2: access network temporary identity information 2, and, the access network temporary identity information set associated with access network context 2 includes access network temporary identity information corresponding to access network context 1: access network temporary identity information 1. At this moment, the access network device may consider that there is the first association relationship between access network context 1 and access network context 2. Table 6 is described by taking an example in which the first association relationship is associated with two pieces of access network context information. The number of the pieces of access network context information actually associated with the first association relationship is not limited in the disclosure.

TABLE 7

| Schematic diagram of first association relationship First association relationship | | |
| --- | --- | --- |
| Second association relationship 1 | | |
| Access network context 1 | Access network temporary identity information 1 and access network temporary identity information 2 | Access network context 2 |

As shown in Table 7, access network context 1 and access network context 2 satisfy the first condition, because the access network temporary identity information set associated with access network context 1 includes access network temporary identity information corresponding to access network context 2: access network temporary identity information 2. At this moment, the access network device may consider that there is the first association relationship between access network context 1 and access network context 2. Table 7 is described by taking an example in which the first association relationship is associated with two pieces of access network context information. The number of the pieces of access network context information actually associated with the first association relationship is not limited in the disclosure.

At S604, configuration information in any access network context of the at least two access network contexts is updated based on the first association relationship.

Optionally, for the target access network context, the configuration information in the target access network context is updated with reference to configuration information in other access network contexts except the target access network in the at least two access network contexts associated with the first association relationship. The target access network context is any access network context of the at least two access network contexts with the first association relationship.

Exemplarily, as shown in Table 5 above, there is the first association relationship between access network context 1 and access network context 2. When configuration information in access network context 1 is updated, refer to the configuration information in access network context 2.

Optionally, the configuration information in the access network context includes at least one of configuration information: a layer 1 related configuration, a layer 2 related configuration, a layer 3 related configuration, a mobility related configuration, or an AS security related configuration.

The layer 1 related configuration corresponds a physical layer related configuration, the layer 2 related configuration includes at least one related configuration of a Medium Access Control (MAC), a Radio Link Control (RLC), a Packet Data Convergence Protocol (PDCP), a Backhaul Adaptation Protocol (BAP), or a Service Data Adaptation Protocol (SDAP), and the layer 3 related configuration includes an RRC related configuration.

Optionally, the first association relationship or the second association relationship between the access network contexts may be transferred between access network devices.

That is, the access network device transfers the access network context to the target access network device through a first interface message. The first interface message further carries at least one of: the first association relationship corresponding to the access network context, or the second association relationship corresponding to the access network context. A first interface is an interface between the access network device and the target access network device. The first interface message is a message transmitted at the first interface.

Exemplarily, the first interface message includes: the second association relationship corresponding to the access network context. Exemplarily, the first interface message includes: the first association relationship corresponding to the access network context and the second association relationship corresponding to the access network context.

Optionally, when the first interface message only includes the second association relationship, the target access network device further includes the first association relationship established between the access network contexts satisfying a meaning of the first condition.

In conclusion, according to the technical solutions provided by the embodiments of the disclosure, the access network device may establish the first association relationship between the access network contexts. When establishing or updating the configuration information contained in the access network contexts, the access network may refer to the configuration information contained in the access network context established by other logical terminal devices associated with the first association relationship, so that the collaboration of the behaviors among a plurality of cards contained one terminal device may be maintained as much as possible, thereby facilitating energy conservation of the terminal device.

Meanwhile, the first association relationship and the second association relationship corresponding to the access network context may be transferred between the access network devices, which avoids the communication overhead caused by re-establishing the above two association relationships.

A first logical terminal device negotiates collaborative operation with a core network device In this implementation, a message that the first logical terminal device interacts with the core network device is an NAS message.

In a schematic embodiment, the first logical terminal device negotiates a collaborative operation item with the core network device through one round trip of interaction: the first logical terminal device transmits the first message to the core network device, and the core network device feeds back a first response message to the first logical terminal device.

Figure 7:
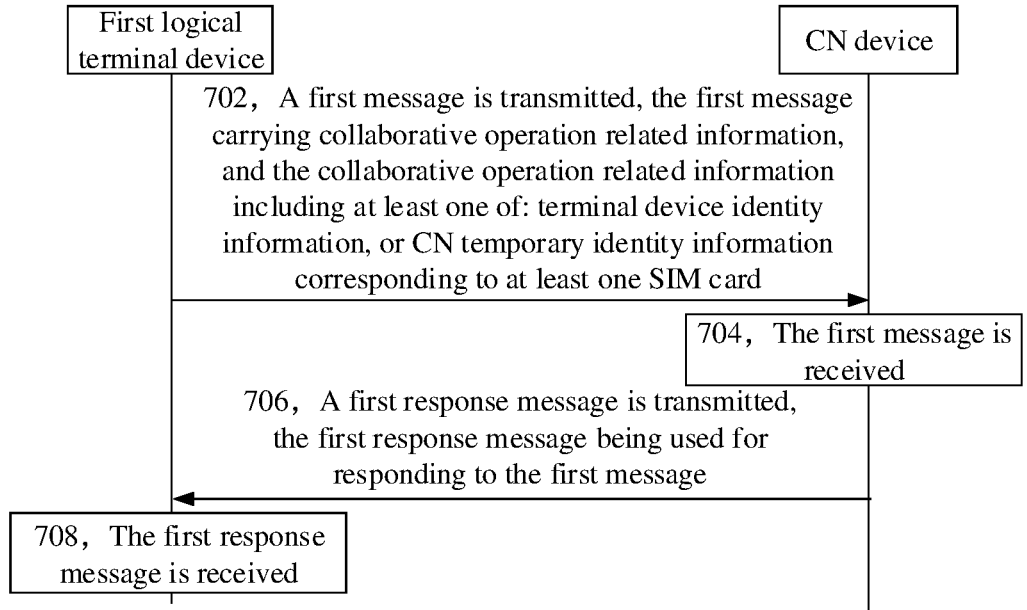
FIG. 7 is a flowchart of a communication method provided by another embodiment of the disclosure.

Refer to FIG. 7, which is a flowchart of a communication method provided by another embodiment of the disclosure. The method may be applied to network architecture shown in FIG. 1. The method may include the following steps (702 to 708).

At S702, the first logical terminal device transmits the first message to the core network device, the first message carrying the collaborative operation related information, and the collaborative operation related information including at least one of: terminal device identity information, or core network temporary identity information corresponding to at least one SIM card.

In this embodiment, the collaborative operation related information at least includes: the terminal device identity information, and/or, the core network temporary identity information corresponding to the at least one SIM card.

The terminal device identity information is used for identifying a hardware resource corresponding to the first logical terminal device. Optionally, the terminal device identity information is a PEI when the hardware resource corresponding to the first logical terminal device leaves a factory, or identity information derived according to the PEI.

The core network temporary identity information is used for identifying a core network context associated with the logical terminal device corresponding to the SIM card in the CN. A specific implementation form of the core network temporary identity information is not limited in the embodiments of the disclosure.

Exemplarily, the terminal device has n SIM cards in total, including the first SIM card corresponding to the first logical terminal device. The collaborative operation related information transmitted by the first logical terminal device to the core network device includes: core network temporary identity information corresponding to the n SIM cards, the core network device may configure m SIM cards of the n SIM cards to perform collaborative operation, n is a positive integer not less than 2, and m is a positive integer not greater than n.

Exemplarily, the terminal device has n SIM cards in total, including the first SIM card corresponding to the first logical terminal device. The collaborative operation related information transmitted by the first logical terminal device to the core network device includes: the terminal device identity information and the core network temporary identity information corresponding to the first SIM card. In a case that other logical terminal devices also transmit the terminal device identity information and the core network temporary identity information corresponding to the SIM cards thereof to the core network device, the core network device may configure to use the corresponding SIM card to perform collaborative operation for the plurality of logical terminal devices corresponding to the same terminal device identity information.

Optionally, the collaborative operation related information further includes at least one of: collaborative operation request information, or collaborative operation request auxiliary information. The collaborative operation request information is used for requesting, from the core network device, the hardware resource corresponding to the first logical terminal device to use at least two SIM cards of the n SIM cards to perform collaborative operation, and the collaborative operation request auxiliary information is used for providing operation content information of the at least one SIM card that is used by the hardware resource corresponding to the first logical terminal device and participates in the collaborative operation for the core network device.

It is to be understood that the SIM cards carried by the first logical terminal device in collaborative operation related information may not necessarily be at least two SIM cards of the n SIM cards configured after final negotiation with a core network device side. Exemplarily, the first logical terminal device carries the following SIM cards in the collaborative operation related information include: SIM card 1, SIM card 2, and SIM card 3, and finally negotiates with the core network device to obtain: using SIM card 1 and SIM card 3 to perform collaborative operation.

In a possible implementation, the function of the collaborative operation request information is implicitly represented by the presence of the terminal device identity information, and/or, the core network temporary identity information corresponding to the at least one SIM card.

Exemplarily, in a case that the first message includes the terminal device identity information, and/or, the core network temporary identity information corresponding to the at least one SIM card, it indicates that the first logical terminal device requests, from the core network device, the hardware resource corresponding to the first logical terminal device to use at least two SIM cards to perform collaborative operation.

Optionally, the collaborative operation request auxiliary information includes at least one of the following information.

Card identity information of at least one SIM card participating in the collaborative operation The card identity information is configured to indicate a logical identity of the SIM card in the same hardware resource.

Exemplarily, three SIM cards are inserted into the same terminal device, and then the three SIM cards above may be respectively identified by using numbers 0, 1, and 2.

Operator information supported by at least one SIM card participating in the collaborative operation The operator information is configured to indicate a network identity of an operator corresponding to the SIM card.

Exemplarily, SIM card 1 belongs to operator 1, SIM card 2 belongs to operator 2, and SIM card 3 belongs to operator 3. The first logical terminal device may report the network identity of the operator supported by the at least one SIM card to the core network device in a form of a list according to a logical identity order of the SIM cards. For example, the first logical terminal device reports list information as {network identity 1, network identity 2, and network identity 3}, network identity 1 corresponds to SIM card 1, network identity 2 corresponds to SIM card 2, and network identity 3 corresponds to SIM card 3. Refer to the following Table 8 for specific details.

TABLE 8

Schematic diagram of reporting format of operator information supported by at least one SIM card participating in collaborative operation
Operator information supported by at least one SIM card participating in collaborative operation

| SIM card 1 | SIM card 2 | . . . | SIM card N |
|---|---|---|---|
| Network identity 1 | Network identity 2 | . . . | Network identity N |

Task type scope information participating in collaborative operation

The task type scope information is configured to indicate at least one task type.

Optionally, the task type scope information participating in the collaborative operation is reported according to the granularity of the terminal device, or according to the granularity of the card identity.

Reporting form 1: reporting according to the granularity of the terminal device

TABLE 9

Schematic diagram of reporting task type scope information according to granularity of terminal device
Task type scope information

| Task type 1 | Task type 2 | . . . | Task type N |
|---|---|---|---|

As shown in Table 9 above, task type reporting does not distinguish card identity, so the task type range information is reported according to the granularity of the terminal device.

Reporting form 2: reporting according to the granularity of the card identity:

TABLE 10

Schematic diagram of reporting task type scope information according to granularity of card identity
Task type scope information

| Card identity of SIM card 1 | Card identity of SIM card 2 | . . . | Card identity of SIM card N |
|---|---|---|---|
| Task information 1 | Task information 2 | . . . | Task information N |

Optionally, the task information corresponding to the card identity of the SIM card is reported in a form of a task type identity information list, or in a form of bit mapping information corresponding to a task type.

Exemplarily, the task information 1 reported by the first logical terminal device is a piece of list information: {network identity 1, network identity 2, and network identity 3}, which indicates that the first logical terminal device requests: for the task type 1, the task type 2, and the task type 3, the collaborative operation may be performed between SIM card 1 and other SIM cards. Exemplarily, the task information 1 reported by the first logical terminal device is a piece of bit mapping information, and each bit in the bit mapping information corresponds to one task type. If the ith bit corresponds to task type i, and the task information 1 is bit mapping information '1010', it indicates that the first logical terminal device requests: for task type 1 and task type 3, collaborative operation may be performed between SIM card 1 and other SIM cards. It is to be understood that this is an exemplary description, and the disclosure does not limit a case with an opposite meaning of a bit value.

As shown in Table 10 above, the task type range information is reported according to the granularity of a card. A correspondence between at least one type of task information and the card identity may be explicit or implicit, and the correspondence between the two is predefined by a communication protocol in an implicit manner.

Optionally, before S702, the first logical terminal device needs to determine whether it is allowed to initiate negotiation of the collaborative operation item. S702 is performed only after determining that it is allowed to initiate the negotiation of the collaborative operation item.

In a possible implementation, the first logical terminal device determines whether it is allowed to initiate the negotiation of the collaborative operation item based on an indication of the network device.

Exemplarily, the access network device transmits fourth indication information for the first logical terminal device. The fourth indication information is configured to indicate whether the first logical terminal device is allowed to initiate the negotiation of the collaborative operation item. Correspondingly, the first logical terminal device receives the fourth indication information sent by the access network device. The fourth indication information is carried in a system broadcast message; or, the fourth indication information is carried in dedicated signaling. At this moment, after receiving the fourth indication information, the first logical terminal device also transmits the fourth indication information to the NAS.

Exemplarily, the core network device transmits the fourth indication information to the first logical terminal device. The fourth indication information is configured to indicate whether the first logical terminal device is allowed to initiate negotiation of the collaborative operation item. Correspondingly, the first logical terminal device receives the fourth indication information transmitted by the core network device. The fourth indication information is carried in NAS signaling.

In another possible implementation, the first logical terminal device determines whether it is allowed to initiate the negotiation of the collaborative operation item based on capability information supported by the same.

At S704, the core network device receives the first message.

At S706, the core network device transmits a first response message to the first logical terminal device, the first response message being configured to respond to the first message.

Optionally, the first response message carries the first indication information. The first indication information is configured to indicate whether the core network device accepts the collaborative operation item.

Optionally, in response to the first indication information indicating the core network device to accept the collaborative operation item, the first response message carries application scope configuration information. The disclosure scope configuration information is configured to indicate a related configuration participating in the collaborative operation.

In a possible implementation, the function of the first indication information is implicitly represented by the presence of the disclosure scope configuration information. Exemplarily, when the first response message carries the disclosure scope configuration information, it indicates that the core network device accepts the collaborative operation item initiated by the first logical terminal device; otherwise, when the first response message does not carry the disclosure scope configuration information, it indicates that the core network device does not accept the collaborative operation item initiated by the first logical terminal device.

In the embodiments of the disclosure, the core network device may transmit the first response message to logical terminal devices associated with the collaborative operation item separately, or may only transmit the first response message to the first logical terminal device. The first logical terminal device notifies content of the first response message to other logical terminal devices associated with the collaborative operation item in an internal notification manner. The logical terminal devices associated with collaborative operation item include: the logical terminal devices respectively corresponding to the SIM cards that are configured on the core network device side and participate in the collaborative operation; or, the logical terminal devices that request to participate in the collaborative operation from the core network device side.

Optionally, related configuration participating in the collaborative operation includes at least one of the following information.

core network temporary identity information corresponding to the at least one SIM card participating in the collaborative operation The core network temporary identity information is used for identifying a core network context associated with the logical terminal device corresponding to the SIM card in the CN.

Exemplarily, the first logical terminal device corresponds to SIM card 1, and the core network device returns to the first logical terminal device: the core network temporary identity information corresponding to SIM card 2, which indicates that SIM card 1 and SIM card 2 may operation collaboratively.

Exemplarily, the first logical terminal device corresponds to SIM card 1, and the core network device returns to the first logical terminal device: the core network temporary identity information corresponding to SIM card 1 and the core network temporary identity information corresponding to SIM card 2, which indicates that SIM card 1 and SIM card 2 may operation collaboratively.

Card identity information of at least one SIM card participating in the collaborative operation The card identity information is configured to indicate a logical identity of the SIM card in the same hardware resource.

Exemplarily, three SIM cards are inserted into the same terminal device, and then the three SIM cards above may be respectively identified by using numbers 0, 1, and 2. Exemplarily, the core network device returns to the first logical terminal device: number 0 and number 1, which indicates that SIM card 1 and SIM card 2 may operation collaboratively. Exemplarily, the core network device returns to the first logical terminal device: number 1, which indicates that SIM card 1 and SIM card 2 may operation collaboratively.

In a possible implementation, the card identity information supports performing bit mapping to obtain bit mapping information. Each bit in the bit mapping information corresponds to one SIM card, and corresponding rules are specified by a protocol, for example, a first bit corresponds to SIM card 1, a second bit corresponds to SIM card 2, and so on. Taking the bit mapping information occupying 4 bits as an example, assuming that the core network device returns '1010', then it indicates that SIM card 1 and SIM card 3 may operation collaboratively. It is to be understood that this is an exemplary description, and the disclosure does not limit a case with an opposite meaning of a bit value.

At least one task type configuration participating in the collaborative operation The at least one task type configuration may be issued in a form of a task type identity information list, or in a form of bit mapping information corresponding to a task type.

Exemplarily, the at least one task type configuration is a piece of list information: {task type 1, task type 2, and task type 3}, which indicates that the collaborative operation may be performed for task type 1, task type 2, and task type 3.

Exemplarily, taking the at least one task type configuration being represented by the bit mapping information as an example for description, each bit in the bit mapping information corresponds to one task type, and corresponding rules are specified by a protocol, for example, a first bit corresponds to task type 1, a second bit corresponds to task type 2, and so on. Taking the bit mapping information occupying 5 bits as an example, assuming that the core network device returns '10100', then it indicates that task type 1 and task type 3 may operation collaboratively. It is to be understood that this is an exemplary description, and the disclosure does not limit a case with an opposite meaning of a bit value.

At S708, the first logical terminal device receives the first response message.

In conclusion, according to the technical solutions provided by the embodiments of the disclosure, the first logical terminal device negotiates the collaborative operation item with the core network device through one round trip of interaction: the first logical terminal device transmits the first message to the core network device, and the core network device feeds back the first response message to the first logical terminal device. Interactions are few, which improves the configuration efficiency of multi-card collaborative operation.

In a schematic embodiment, the first logical terminal device negotiates the collaborative operation item with the core network device through two round trips of interaction: the first logical terminal device transmits the first message to the core network device, and the core network device feeds back a second response message to the first logical terminal device; and the first logical terminal device transmits a second message to the core network device, and the core network device feeds back a third response message to the first logical terminal device.

Figure 8:
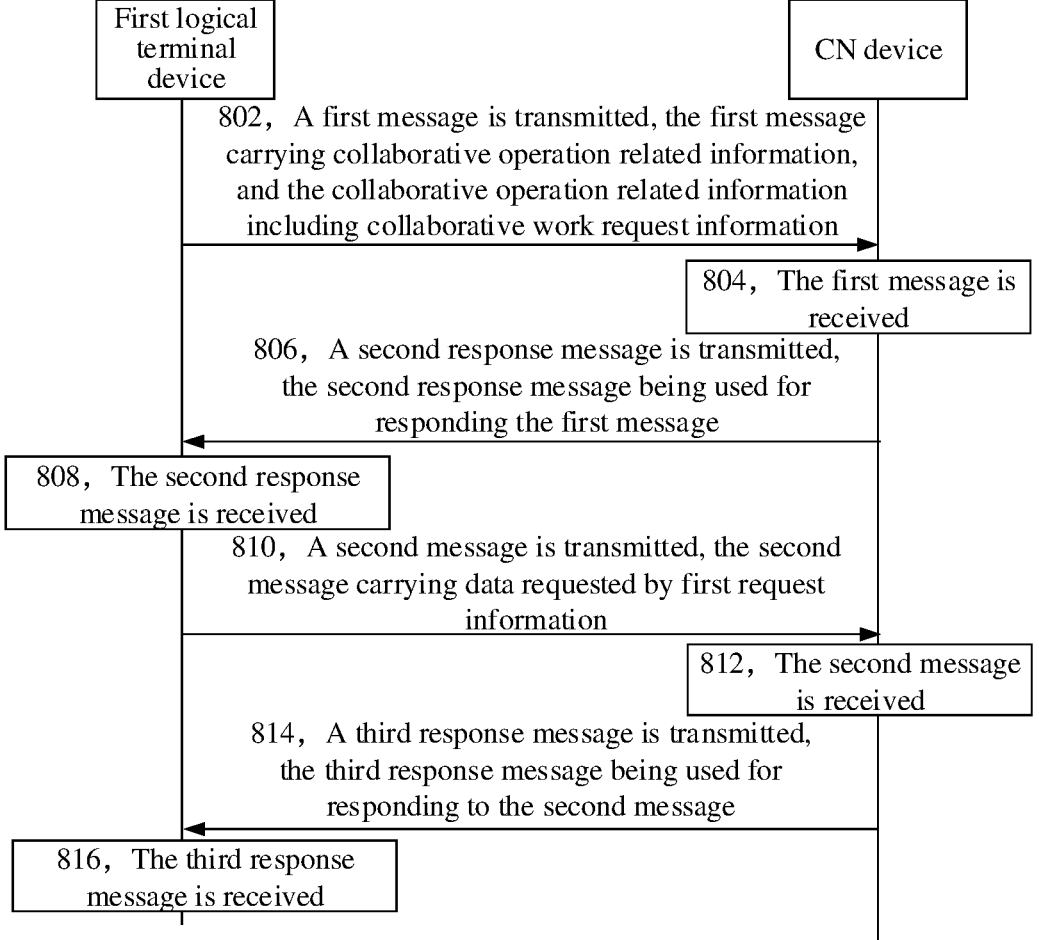
FIG. 8 is a flowchart of a communication method provided by another embodiment of the disclosure.

Refer to FIG. 8, which is a flowchart of a communication method provided by another embodiment of the disclosure. The method may be applied to network architecture shown in FIG. 1. The method may include the following steps (802 to 816).

At S802, the first logical terminal device transmits the first message to the core network device, the first message carrying the collaborative operation related information, and the collaborative operation related information including collaborative operation request information.

In this embodiment, the collaborative operation related information at least includes: collaborative operation request information.

The collaborative operation request information is used for requesting, from the core network device, the hardware resource corresponding to the first logical terminal device to use at least two SIM cards of the n SIM cards to perform collaborative operation.

Optionally, before S802, the first logical terminal device needs to determine whether it is allowed to initiate negotiation of the collaborative operation item. Step 802 is performed only after determining that it is allowed to initiate the negotiation of the collaborative operation item.

In a possible implementation, the first logical terminal device determines whether it is allowed to initiate the negotiation of the collaborative operation item based on an indication of the network device.

Exemplarily, the access network device transmits fourth indication information for the first logical terminal device. The fourth indication information is configured to indicate whether the first logical terminal device is allowed to initiate the negotiation of the collaborative operation item. Correspondingly, the first logical terminal device receives the fourth indication information sent by the access network device. The fourth indication information is carried in a system broadcast message; or, the fourth indication information is carried in dedicated signaling. At this moment, after receiving the fourth indication information, the first logical terminal device also transmits the fourth indication information to the NAS.

Exemplarily, the core network device transmits the fourth indication information to the first logical terminal device. The fourth indication information is configured to indicate whether the first logical terminal device is allowed to initiate negotiation of the collaborative operation item. Correspondingly, the first logical terminal device receives the fourth indication information transmitted by the core network device. The fourth indication information is carried in NAS signaling.

In another possible implementation, the first logical terminal device determines whether it is allowed to initiate the negotiation of the collaborative operation item based on capability information supported by the same.

At S804, the core network device receives the first message.

At S806, the core network device transmits a second response message to the first logical terminal device, the second response message being configured to respond to the first message.

Optionally, the second response message carries at least one of: second indication information or first request information.

The second indication information is configured to indicate the core network device whether to accept the collaborative operation item, and the first request information is used for requesting the terminal device to report at least one of: terminal device identity information, which is used for identifying a hardware resource corresponding to the first logical terminal device; or core network temporary identity information corresponding to at least one SIM card.

In a possible implementation, the function of the second indication information is implicitly represented by the presence of the first request information. Exemplarily, when the second response message carries the first request information, it indicates that the core network device accepts the collaborative operation item initiated by the first logical terminal device; otherwise, when the second response message does not carry the first request information, it indicates that the core network device does not accept the collaborative operation item initiated by the first logical terminal device.

The terminal device identity information is used for identifying a hardware resource corresponding to the first logical terminal device. Optionally, the terminal device identity information is a PEI when the hardware resource corresponding to the first logical terminal device leaves a factory, or identity information derived according to the PEI.

The core network temporary identity information is used for identifying a core network context associated with the logical terminal device corresponding to the SIM card in the CN.

Optionally, the first request information is also used for requesting the first logical terminal device to report collaborative operation request auxiliary information. The collaborative operation request auxiliary information is used for providing operation content information of the at least one SIM card that is used by the hardware resource corresponding to the first logical terminal device and participates in the collaborative operation for the core network device.

Optionally, the collaborative operation request auxiliary information includes at least one of the following information.

Card identity information of at least one SIM card participating in the collaborative operation Operator information supported by at least one SIM card participating in the collaborative operation Task type scope information participating in collaborative operation For specific implementation forms of the three types of information above, refer to the above embodiments, which will not be elaborated herein.

At S808, the first logical terminal device receives the second response message.

It is to be understood that, if the second response message includes the second indication information, and the second indication information indicates that the core network device does not accept the collaborative operation item, then the following steps 810 to 816 will not be continued to be performed.

At S810, the first logical terminal device transmits a second message to the core network device, the second message carrying data requested by the first request information.

Exemplarily, based on a request in the first request information, the second message carries at least one of: terminal device identity information, which is used for identifying a hardware resource corresponding to the first logical terminal device; core network temporary identity information corresponding to at least one SIM card; or collaborative operation request auxiliary information, which is used for providing operation content information of the at least one SIM card that is used by the hardware resource corresponding to the first logical terminal device and participates in the collaborative operation for the core network device.

At S812, the core network device receives the second message.

At S814, the core network device transmits a third response message to the first logical terminal device, the third response message being configured to respond to the second message.

Optionally, the third response message carries at least one of: third indication information and application scope configuration information. The third indication information is configured to indicate whether the core network device accepts the collaborative operation item. The disclosure scope configuration information is configured to indicate a related configuration participating in the collaborative operation.

In a possible implementation, the function of the third indication information is implicitly represented by the presence of the disclosure scope configuration information. Exemplarily, when the third response message carries the disclosure scope configuration information, it indicates that the core network device accepts the collaborative operation item initiated by the first logical terminal device; otherwise, when the third response message does not carry the disclosure scope configuration information, it indicates that the core network device does not accept the collaborative operation item initiated by the first logical terminal device.

In the embodiments of the disclosure, the core network device may transmit the third response message to logical terminal devices associated with the collaborative operation item separately, or may only transmit the first response message to the third logical terminal device. The first logical terminal device notifies content of the third response message to other logical terminal devices associated with the collaborative operation item in an internal notification manner. The logical terminal devices associated with collaborative operation item include: the logical terminal devices respectively corresponding to the SIM cards that are configured on the core network device side and participate in the collaborative operation; or, the logical terminal devices that request to participate in the collaborative operation from the core network device side.

It is to be understood that in a case that the core network device side indicates whether to accept the collaborative operation item in an indication manner of displaying, the NC device may indicate whether to accept the collaborative operation item through the second indication information in S806 above, or whether to accept the collaborative operation item through the third indication information in S814 above.

Optionally, related configuration participating in the collaborative operation includes at least one of the following information.

core network temporary identity information corresponding to the at least one SIM card participating in the collaborative operation Card identity information of at least one SIM card participating in the collaborative operation At least one task type configuration participating in the collaborative operation For specific implementation forms of the three configurations above, refer to the above embodiments, which will not be elaborated herein.

At S816, the first logical terminal device receives the third response message.

In conclusion, according to the technical solution provided by the embodiments of the disclosure, the first logical terminal device negotiates the collaborative operation item with the core network device through two round trips of interaction: the first logical terminal device transmits the first message to the core network device, and the core network device feeds back the second response message to the first logical terminal device; and the first logical terminal device transmits the second message to the core network device, and the core network device feeds back the third response message to the first logical terminal device. Through the above interaction, the first logical terminal device report the message to the core network twice, which is beneficial for the first logical terminal device to stop reporting the collaborative operation related information in a case that the core network device does not accept the collaborative operation item.

In a schematic embodiment, the first logical terminal device will enable a multi-card collaborative operation mode to perform collaborative operation after confirming that the core network device accepts the collaborative operation initiated by the first logical terminal device, that is, completing a negotiation with the core network device.

Refer to FIG. 9, which is a flowchart of a communication method provided by another embodiment of the disclosure. The method may be applied to network architecture shown in FIG. 1. The method may include the following step.

At S902, in response to a successful negotiation of a collaborative operation item, the NAS of the first logical terminal device enables a multi-card collaborative operation mode, and transmits a first notification message to an AS of the first logical terminal device.

The first notification message is used for notifying the AS to enable the multi-card collaborative operation mode. The multi-card collaborative operation mode allows a target logical terminal device participating in the collaborative operation to check related data of a preset task corresponding to other SIM cards except the SIM card corresponding to the target logical terminal device in the at least two SIM cards participating in the collaborative operation first before performing the preset task, or allows the target logical terminal device participating in the collaborative operation to transmit the related data of the preset task to a logical terminal device corresponding to the other SIM cards except the SIM card corresponding to the target logical terminal device in the at least two SIM cards participating in the collaborative operation after the target logical terminal device participating in the collaborative operation completes the preset task.

Optionally, the first notification message includes at least one of the following information.

Indication information allowing to enable multi-card collaborative operation mode Exemplarily, one bit is configured to indicate whether to enable the multi-card collaborative operation mode. When the AS receives "1", it indicates that the AS is allowed to enable the multi-card collaborative operation mode. It is to be understood that this is an exemplary description, and the disclosure does not limit a case with an opposite meaning of a bit value.

Card identity information of at least one SIM card participating in the collaborative operation For specific information, refer to the above embodiments, which will not be elaborated herein.

core network temporary identity information corresponding to the at least one SIM card participating in the collaborative operation For specific information, refer to the above embodiments, which will not be elaborated herein.

Task type scope information participating in collaborative operation

For specific information, refer to the above embodiments, which will not be elaborated herein.

In a possible implementation, the multi-card collaborative operation mode only allows the first logical terminal device that initiates the collaborative operation item to check the related data of the preset task corresponding to the other SIM cards except the first SIM card participating in the collaborative operation first before performing the preset task, or allows the first logical terminal device participating in the collaborative operation to transmit the related data of the preset task to the logical terminal device corresponding to the other SIM cards except the first SIM card participating in the collaborative operation for use after completing preset task.

In another possible implementation, the multi-card collaborative operation mode allows any first logical terminal device participating in the collaborative operation to check related data of a preset task corresponding to other SIM cards participating in the collaborative operation first before performing the preset task, or allows the any first logical terminal device participating in the collaborative operation to transmit the related data of the preset task to the logical terminal device corresponding to the other SIM cards participating in the collaborative operation for use after completing preset task.

It is to be understood that the preset task may be determined by the logical terminal device participating in the collaborative operation based on a task type configuration issued by the core network device, or may be predefined in a communication protocol.

Optionally, the preset task includes at least one of: a system information acquisition task, a system information update task, a measurement related task, a paging receiving task, a configuration update task, or a re-registration task. For specific content of the tasks of the above types, refer to related definitions in the communication protocol, which will not be elaborated herein.

Exemplarily, the terminal device first checks system information stored in other SIM cards participating in the collaborative operation before performing the system information update task associated with a certain SIM card. If the system information stored in the other SIM cards has been updated, for example, a system information version is determined through a value tag, then whether the system information has been updated is determined, and the terminal device may directly copy the system information stored in internal memories of the other SIM cards to an internal memory of the SIM card with the system information that needs to be updated through an internal unit of a hardware device without re-receiving corresponding information through a Uu air interface, thereby reducing the energy consumption of the terminal device.

Optionally, the related data of the preset task includes at least one of: configuration data; or start data used for activating the preset task.

Optionally, the related data of the preset task further includes at least one of: data calculated according to the configuration data; or data obtained according to a measurement process.

Exemplarily, the configuration data issued by the access network device includes timing advance, then the target logical terminal device calculates RTT based on the timing advance. The RTT may be considered as the data calculated according to the configuration data.

Exemplarily, the target logical terminal device measures to obtain a cell measurement result based on the measurement configuration issued by the access network device. The cell measurement result may be considered as the data obtained according to the measurement process.

In conclusion, according to the technical solutions provided by this embodiment, the target logical terminal device participating in the collaborative operation checks related data of the preset task corresponding to other SIM cards except the SIM card corresponding to the target logical terminal device in the at least two SIM cards participating in the collaborative operation first before performing the preset task, or the target logical terminal device transmits the related data of the preset task to the logical terminal device corresponding to the other SIM cards except the SIM card corresponding to the target logical terminal device in the at least two SIM cards participating in the collaborative operation after completing the preset task, so as to help reduce the demand for the logical terminal device to request the preset task from a network side, or the demand for the present side to perform corresponding measurement and calculation, thereby helping the hardware resource corresponding to the logical terminal device save electricity.

In an exemplary embodiment, the core network device will establish a third association relationship between core network contexts. When configuration information contained in the core network contexts is established or updated, refer to the configuration information contained in the core network contexts established by other logical terminal devices associated with the third association relationship.

Figure 10:
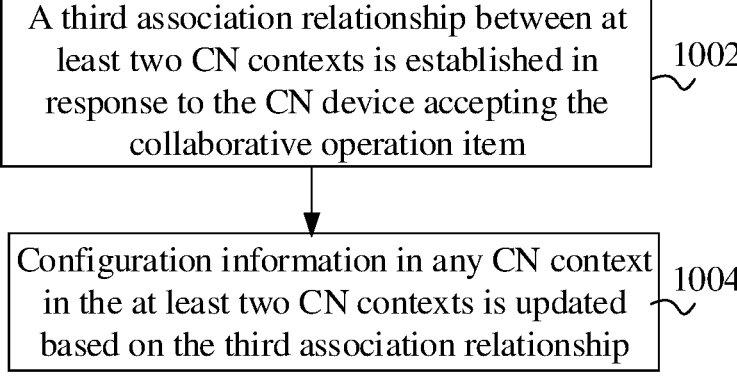
FIG. 10 is a flowchart of a communication method provided by another embodiment of the disclosure.

Refer to FIG. 10, which is a flowchart of a communication method provided by another embodiment of the disclosure. The method may be applied to a core network in network architecture shown in FIG. 1. The method may include the following steps (1002 to 1004).

At S1002, a third association relationship between at least two core network contexts is established in response to the core network device accepting the collaborative operation item.

On the NC device side, after accepting the collaborative operation item, the core network device establishes a third association relationship between at least two core network contexts.

Optionally, the core network device establishes a fourth association relationship for the core network context corresponding to the logical terminal device. Based on the fourth association relationship, the first association relationship is established between at least two core network contexts satisfying a second condition. That is, S1002 may be alternately implemented as: in response to the at least two core network contexts satisfying the second condition, the core network device establishes a third association relationship between the at least two core network contexts. The second condition is associated with the fourth association relationship corresponding to the core network context.

Exemplarily, the first logical terminal device and the core network device negotiate a collaborative operation item. The core network device first establishes the fourth association relationship for the first core network context corresponding to the first logical terminal device, and then establishes the third association relationship between the first core network context and the other core network contexts in the presence of other core network contexts that satisfy the second condition with the first core network context.

The fourth association relationship is used for representing the association relationship between the core network context and a second logical identity. The second logical identity is at least one of: terminal device identity information, collaborative operation identity information, or a core network temporary identity information set.

The terminal device identity information is used for identifying a hardware resource corresponding to the logical terminal device. Optionally, the terminal device identity information is a PEI when the hardware resource corresponding to the logical terminal device leaves a factory, or identity information derived according to the PEI. In the embodiments of the disclosure, the core network device not only acquires the terminal device identity information through reporting of the logical terminal device, but also acquires the terminal device identity information through a core network context transferring process between core network devices.

The collaborative operation identity information is generated based on the terminal device identity information. In the embodiments of the disclosure, the bits occupied by the collaborative operation identity information are less than those occupied by the terminal device identity information. If the hardware resource corresponding to the logical terminal device is identified by using the collaborative operation identity information instead of the terminal device identity information, on one hand, storage bits may be saved, and on the other hand, a security risk caused by frequently using original terminal device identity information can be avoided.

The core network temporary identity information set includes the core network temporary identity information corresponding to at least one SIM card in the collaborative operation in which the logical terminal device corresponding to the core network context participates. The core network temporary identity information is used for identifying a core network context associated with the logical terminal device corresponding to the SIM card in the CN.

TABLE 11

| Schematic diagram of fourth association relationship Fourth association relationship | |
|---|---|
| CN context | Terminal device identity information or collaborative operation identity information or core network temporary identity information set |

As shown in Table 11 above, the fourth association relationship associates the terminal device identity information or the cooperative operation identity or the core network network temporary identity information set with the core network context corresponding to the logical terminal device, so as to facilitate the associated with a logical terminal device corresponding to the SIM card in the core network device to associate a plurality of core network contexts satisfying the second condition together to obtain the third association relationship.

Optionally, the meaning of the second condition includes any one of the following.

The terminal device identity information associated with each of the fourth association relationships respectively corresponding to the at least two core network contexts is the same.

The terminal device identity information associated with each of the fourth association relationships respectively corresponding to the at least two core network contexts is the same, then the core network device considers that the at least two core network contexts satisfy the second condition, and establishes the third association relationship for them.

The collaborative operation identity information associated with each of the fourth association relationships respectively corresponding to the at least two core network contexts is the same.

The collaborative operation identity information associated with each of the fourth association relationships respectively corresponding to the at least two core network contexts is the same, then the core network device considers that the at least two core network contexts satisfy the second condition, and establishes the third association relationship for them.

The core network temporary identity information set associated with the fourth association relationship corresponding to the target core network context includes the core network temporary identity information corresponding to the other core network contexts except the target core network context of the at least two core network contexts, and the target core network context is any core network context of the at least two core network contexts.

That is, in the at least two core network contexts, the core network temporary identity information set associated with the fourth association relationship corresponding to any core network context includes the core network temporary identity information corresponding to the other core network contexts, and then the core network device considers that the at least two core network contexts satisfy the second condition, and establishes the third association relationship for them.

The core network temporary identity information set associated with the fourth association relationship corresponding to the target core network context includes the core network temporary identity information corresponding to the other core network contexts except the target core network context of the at least two core network contexts, and the target core network context is one core network context that is established with the fourth association relationship of the at least two core network contexts.

That is, in a case that there is one core network context that is established with the fourth association relationship, and the core network temporary identity information set associated with the fourth association relationship corresponding to the core network context includes the core network temporary identity information corresponding to the other core network contexts, then the core network device considers that the core network context and the other core network contexts satisfy the second condition, and establishes the third association relationship for them.

An exemplary description for the meaning of the second condition is given below.

TABLE 12

| Schematic diagram of Third association relationship | | | |
|---|---|---|---|
| Third association relationship | | | |
| Fourth association relationship 1 | | Fourth association relationship 2 | |
| CN context 1 | Terminal device identity information 1 or collaborative operation identity information 1 | CN context 2 | Terminal device identity information 1 or collaborative operation identity information 1 |

As shown in Table 12, core network context 1 and core network context 2 satisfy the second condition, because the terminal device identity information or the collaborative operation identity information associated with core network context 1 and core network context 2 is the same. At this moment, the core network device may consider that there is the third association relationship between core network context 1 and core network context 2. Table 11 is described by taking an example in which the third association relationship is associated with two pieces of core network context information. The number of the pieces of core network context information actually associated with the third association relationship is not limited in the disclosure.

TABLE 13

| Schematic diagram of third association relationship | | | |
|---|---|---|---|
| Third association relationship | | | |
| Fourth association relationship 1 | | Fourth association relationship 2 | |
| CN context 1 | core network temporary identity information 1 and core network temporary identity information 2 | CN context 2 | core network temporary identity information 1 and core network temporary identity information 2 |

As shown in Table 13, core network context 1 and core network context 2 satisfy the second condition, because the core network temporary identity information set associated with core network context 1 includes core network temporary identity information corresponding to core network context 2: core network temporary identity information 2, and, the core network temporary identity information set associated with core network context 2 includes core network temporary identity information corresponding to core network context 1: core network temporary identity information 1. At this moment, the core network device may consider that there is the third association relationship between core network context 1 and core network context 2. Table 13 is described by taking an example in which the third association relationship is associated with two pieces of core network context information. The number of the pieces of core network context information actually associated with the third association relationship is not limited in the disclosure.

TABLE 14

| Schematic diagram of third association relationship | | |
|---|---|---|
| Third association relationship | | |
| Fourth association relationship 1 | | |
| CN context 1 | core network temporary identity information 1 and core network temporary identity information 2 | CN context 2 |

As shown in Table 14, core network context 1 and core network context 2 satisfy the second condition, because the core network temporary identity information set associated with core network context 1 includes core network temporary identity information corresponding to core network context 2: core network temporary identity information 2. At this moment, the core network device may consider that there is the third association relationship between core network context 1 and core network context 2. Table 7 is described by taking an example in which the third association relationship is associated with two pieces of core network context information. The number of the pieces of core network context information actually associated with the third association relationship is not limited in the disclosure.

At S1004, configuration information in any core network context of the at least two core network contexts is updated based on the third association relationship.

Optionally, for the target core network context, the configuration information in the target core network context is updated with reference to configuration information in other core network contexts except the target core network in the at least two core network contexts associated with the third association relationship, and the target core network context is any core network context of the at least two core network contexts with the third association relationship.

Exemplarily, as shown in Table 12 above, there is the third association relationship between core network context 1 and core network context 2. When configuration information in core network context 1 is updated, refer to the configuration information in core network context 2.

Optionally, the configuration information in the core network context includes at least one of configuration information: core network temporary identity information, a NAS security related configuration, a registration area related configuration, a terminal NAS capability related configuration, or a channel address related configuration with an access network.

Optionally, the third association relationship or the fourth association relationship between the core network contexts may be transferred between core network devices. That is, the core network device transfers the core network context to the target core network device through a third interface message. The third interface message further carries at least one of: the third association relationship corresponding to the core network context, or the fourth association relationship corresponding to the core network context. A third interface is an interface between the core network device and the target core network device. The third interface message is a message transmitted at the third interface.

Exemplarily, the third interface message includes: the fourth association relationship corresponding to the core network context. Exemplarily, the third interface message includes: the third association relationship corresponding to the core network context and the fourth association relationship corresponding to the core network context.

Optionally, when the third interface message only includes the fourth association relationship, the target core network device further includes the third association relationship established between the core network contexts satisfying a meaning of the second condition.

In conclusion, according to the technical solutions provided by the embodiments of the disclosure, the core network device may establish the third association relationship between the core network contexts. When establishing or updating the configuration information contained in the core network contexts, the core network may refer to the configuration information contained in the core network context established by other logical terminal devices associated with the third association relationship, so that the collaboration of the behaviors among a plurality of cards contained one terminal device may be maintained as much as possible, thereby facilitating energy conservation of the terminal device.

Meanwhile, the third association relationship and the fourth association relationship corresponding to the core network context may be transferred between the core network devices, which avoids the communication overhead caused by re-establishing the above two association relationships.

In an exemplary embodiment, in order to assist the access network device side in achieving multi-card collaborative operation, in addition to establishing or updating the core network context on the present side, the core network device also notifies the access network device to establish or update the corresponding access network context. The access network device will establish a fifth association relationship between access network contexts. When configuration information contained in the access network contexts is established or updated, refer to the configuration information contained in the access network contexts established by other logical terminal devices associated with the fifth association relationship.

Figure 11:
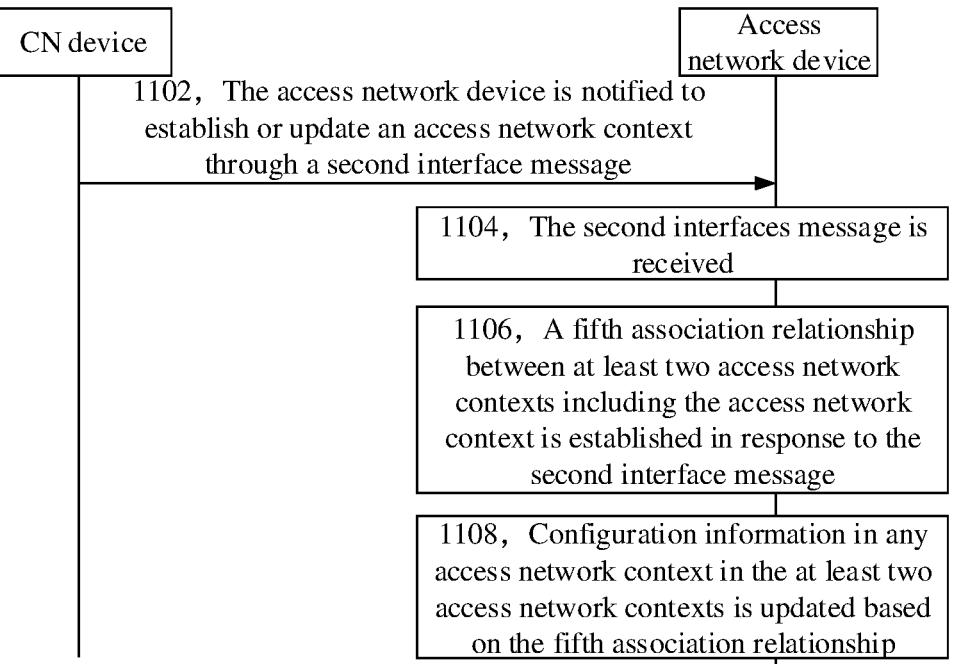
FIG. 11 is a flowchart of a communication method provided by another embodiment of the disclosure.

Refer to FIG. 11, which is a flowchart of a communication method provided by another embodiment of the disclosure. The method may be applied to network architecture shown in FIG. 1. The method may include the following steps (1102 to 1108).

At S1102, a core network device establishes or updates the access network context through a second interface message.

In the embodiments of the disclosure, after establishing a core network context corresponding to one logical terminal device, and establishing the third association relationship and/or the fourth association relationship corresponding to the core network context, the core network device notifies the access network device to establish or update the corresponding access network context through a second interface message. The access network context and the core network context correspond to the same logical terminal device.

Exemplarily, after establishing the third association relationship and/or the fourth association relationship corresponding to the first core network context corresponding to the first logical terminal device, the core network device notifies the access network device to establish or update the access network context of the first logical terminal device through the second interface message.

A second interface is an interface between the core network device and the access network device. The second interface message is a message transmitted at the second interface.

The second interface message further carries a second logical identity associated with the core network context, and the access network context and the core network context correspond to the same logical terminal device. The second logical identity is at least one of: terminal device identity information, collaborative operation identity information, or a core network temporary identity information set. For specific implementation forms of the three types of information above, refer to the above embodiments, which will not be elaborated herein.

At S1104, the access network device receives the second interfaces message.

The second interface message is used for notifying an access network device to establish or update the access network context.

At S1106, the access network device establishes a fifth association relationship between at least two access network contexts including the access network context in response to the second interface message.

On an access network side, after receiving the second interface message and establishing or updating the access network context, the access network device establishes a fifth association relationship between at least two access network contexts including the access network context.

Optionally, the access network device establishes a sixth association relationship for the access network context, and establishes the fifth association relationship between at least two access network contexts satisfying a third condition based on the sixth association relationship. That is, S1106 may be alternately implemented as: in response to the at least two access network contexts satisfying the third condition, the fifth association relationship between the at least two access network contexts including the access network context is established. The third condition is related to the sixth association relationship corresponding to the access network context.

Exemplarily, the access network device first establishes the sixth association relationship for the first access network context corresponding to the first logical terminal device, and then establishes the fifth association relationship between the first access network context and the other access network contexts in the presence of other access network contexts that satisfy the third condition with the first access network context.

The sixth association relationship is used for representing the association relationship between the access network context and a third logical identity. The third logical identity is at least one of: terminal device identity information, collaborative operation identity information, an access network temporary identity information set, or a core network temporary identity information set.

The terminal device identity information is used for identifying a hardware resource corresponding to the logical terminal device. Optionally, the terminal device identity information is a PEI when the hardware resource corresponding to the logical terminal device leaves a factory, or identity information derived according to the PEI. In the embodiments of the disclosure, the access network device not only acquires the terminal device identity information through reporting of the logical terminal device, but also acquires the terminal device identity information through an access network context transferring process between access network devices.

The collaborative operation identity information is generated based on the terminal device identity information. In the embodiments of the disclosure, the bits occupied by the collaborative operation identity information are less than those occupied by the terminal device identity information. If the hardware resource corresponding to the logical terminal device is identified by using the collaborative operation identity information instead of the terminal device identity information, on one hand, storage bits may be saved, and on the other hand, a security risk caused by frequently using original terminal device identity information can be avoided.

The access network temporary identity information set includes the access network temporary identity information corresponding to at least one SIM card in the collaborative operation in which the logical terminal device corresponding to the access network context participates. The access network temporary identity information is used for identifying an access network context associated with the logical terminal device corresponding to the SIM card in the access network. Optionally, the access network temporary identity information is C-RNTI or I-RNTI.

The core network temporary identity information set includes the core network temporary identity information corresponding to at least one SIM card in the collaborative operation in which the logical terminal device corresponding to the access network context participates. The core network temporary identity information is used for identifying a core network context associated with the logical terminal device corresponding to the SIM card in the CN. A specific implementation form of the core network temporary identity information is not limited in the embodiments of the disclosure.

TABLE 15

| Schematic diagram of sixth association relationship<br>Sixth association relationship | |
|---|---|
| Access network context | Terminal device identity information<br>or collaborative operation identity<br>information<br>or access network temporary identity<br>information set<br>or core network temporary identity<br>information set |

As shown in Table 15 above, the sixth association relationship associates the terminal device identity information or the cooperative operation identity or the access network temporary identity information set or the core network temporary identity information set with the access network context corresponding to the logical terminal device, so as to facilitate the access network device to associate a plurality of access network contexts satisfying the third condition together to obtain the fifth association relationship.

Optionally, the meaning of the third condition includes any one of the following.

The terminal device identity information associated with the sixth association relationship corresponding to the at least two access network contexts is the same.

The terminal device identity information associated with the sixth association relationship corresponding to the at least two access network contexts is the same, then the access network device considers that the at least two access network contexts satisfy the third condition, and establishes the fifth association relationship for them.

The collaborative operation identity information associated with each of the sixth association relationships respectively corresponding to the at least two access network contexts is the same.

The collaborative operation identity information associated with each of the sixth association relationships respectively corresponding to the at least two access network contexts is the same, then the access network device considers that the at least two access network contexts satisfy the third condition, and establishes the fifth association relationship for them.

The access network temporary identity information set associated with the sixth association relationship corresponding to the target access network includes the access network temporary identity information corresponding to the other access network contexts except the target access network in the at least two access network contexts, and the target access network context is any access network context of the at least two access network contexts.

That is, in the at least two access network contexts, the access network temporary identity information set associated with the sixth association relationship corresponding to any access network context includes the access network temporary identity information corresponding to the other access network contexts, and then the access network device considers that the at least two access network contexts satisfy the third condition, and establishes the fifth association relationship for them.

The access network temporary identity information set associated with the sixth association relationship corresponding to the target access network context includes the access network temporary identity information corresponding to the other access network contexts except the target access network context of the at least two access network contexts, and the target access network context is one access network context that is established with the fourth association relationship of the at least two access network contexts.

That is, in a case that there is an access network context that is established with the sixth association relationship, and the access network temporary identity information set associated with the sixth association relationship corresponding to the target access network includes the access network temporary identity information corresponding to the other access network contexts, then the access network device considers that the access network context and the other access network contexts satisfy the third condition, and establishes the fifth association relationship for them.

The core network temporary identity information set associated with the sixth association relationship corresponding to the target access network includes the core network network temporary identity information corresponding to the other access network contexts except the target access network in the at least two access network contexts, and the target access network context is any access network context of the at least two access network contexts.

That is, in the at least two access network contexts, the core network temporary identity information set associated with the sixth association relationship corresponding to any access network context includes the core network temporary identity information corresponding to the other access network contexts, and then the access network device considers that the at least two access network contexts satisfy the third condition, and establishes the fifth association relationship for them.

The core network temporary identity information set associated with the sixth association relationship corresponding to the target access network context includes the core network temporary identity information corresponding to the other access network contexts except the target access network context of the at least two access network contexts, and the target access network context is one access network context that is established with the fourth association relationship of the at least two access network contexts.

That is, in a case that there is an access network context that is established with the sixth association relationship, and the core network temporary identity information set associated with the sixth association relationship corresponding to the target access network includes the core network temporary identity information corresponding to the other access network contexts, then the access network device considers that the access network context and the other access network contexts satisfy the third condition, and establishes the fifth association relationship for them.

An exemplary description for the meaning of the third condition is given below.

TABLE 16

| Schematic diagram of fifth association relationship Fifth association relationship | | | |
|---|---|---|---|
| Sixth association relationship 1 | | Sixth association relationship 2 | |
| Access network context 1 | Terminal device identity information 1 or collaborative operation identity information 1 | Access network context 2 | Terminal device identity information 1 or collaborative operation identity information 1 |

As shown in Table 16, access network context 1 and access network context 2 satisfy the third condition, because the terminal device identity information or the collaborative operation identity information associated with access network context 1 and access network context 2 is the same. At this moment, the access network device may consider that there is the Fifth association relationship between access network context 1 and access network context 2. Table 16 is described by taking an example in which the fifth association relationship is associated with two pieces of access network context information. The number of the pieces of access network context information actually associated with the fifth association relationship is not limited in the disclosure.

TABLE 17

| Schematic diagram of fifth association relationship Fifth association relationship | | | |
|---|---|---|---|
| Sixth association relationship 1 | | Sixth association relationship 2 | |
| Access network context 1 | Access network temporary identity information 1 and access network temporary identity information 2 | Access network context 2 | Access network temporary identity information 1 and access network temporary identity information 2 |

As shown in Table 17, access network context 1 and access network context 2 satisfy the third condition, because the access network temporary identity information set associated with access network context 1 includes access network temporary identity information corresponding to access network context 2: access network temporary identity information 2, and, the access network temporary identity information set associated with access network context 2 includes access network temporary identity information corresponding to access network context 1: access network temporary identity information 1. At this moment, the access network device may consider that there is the fifth association relationship between access network context 1 and access network context 2. Table 17 is described by taking an example in which the fifth association relationship is associated with two pieces of access network context information. The number of the pieces of access network context information actually associated with the fifth association relationship is not limited in the disclosure.

In a case that the third logical identity associated with the sixth association relationship is the core network temporary identity information set, whether the access network context satisfies the third condition based on the sixth association relationship may be obtained by analogy as shown in Table 17 above, which will not be elaborated here.

TABLE 18

| Schematic diagram of fifth association relationship Fifth association relationship | | |
|---|---|---|
| Sixth association relationship 1 | | |
| Access network context 1 | Access network temporary identity information 1 and access network temporary identity information 2 | Access network context 2 |

As shown in Table 18, access network context 1 and access network context 2 satisfy the third condition, because the access network temporary identity information set associated with access network context 1 includes access network temporary identity information corresponding to access network context 2: access network temporary identity information 2. At this moment, the access network device may consider that there is the fifth association relationship between access network context 1 and access network context 2. Table 18 is described by taking an example in which the fifth association relationship is associated with two pieces of access network context information. The number of the pieces of access network context information actually associated with the fifth association relationship is not limited in the disclosure.

In a case that the third logical identity associated with the sixth association relationship is the core network temporary identity information set, whether the access network context satisfies the third condition based on the sixth association relationship may be obtained by analogy as shown in Table 18 above, which will not be elaborated here.

At S1108, configuration information in any access network context of the at least two access network contexts is updated based on the fifth association relationship.

Optionally, for the target access network context, the configuration information in the target access network context is updated with reference to configuration information in other access network contexts except the target access network in the at least two access network contexts associated with the fifth association relationship, and the target access network context is any access network context of the at least two access network contexts with the fifth association relationship.

Exemplarily, as shown in Table 16 above, there is the fifth association relationship between access network context 1 and access network context 2. When configuration information in access network context 1 is updated, refer to the configuration information in access network context 2.

Optionally, the configuration information in the access network context includes at least one of configuration information: a layer 1 related configuration, a layer 2 related configuration, a layer 3 related configuration, a mobility related configuration, or an AS security related configuration.

The layer 1 related configuration corresponds a physical layer related configuration, the layer 2 related configuration includes at least one related configuration of a MAC, an RLC, a PDCP, a BAP, or a SDAP, and the layer 3 related configuration includes an RRC related configuration.

Optionally, the fifth association relationship or the sixth association relationship between the access network contexts may be transferred between access network devices. That is, the access network device transfers the access network context to the target access network device through a fourth interface message. The fourth interface message further carries at least one of: the fifth association relationship corresponding to the access network context, or the sixth association relationship corresponding to the access network context. A fourth interface is an interface between the access network device and the target access network device. The fourth interface message is a message transmitted at the fourth interface.

Exemplarily, the fourth interface message includes: the fifth association relationship corresponding to the access network context. Exemplarily, the fourth interface message includes: the fifth association relationship corresponding to the access network context and the sixth association relationship corresponding to the access network context.

Optionally, when the fourth interface message only includes the sixth association relationship, the target access network device further includes the fifth association relationship established between the access network contexts satisfying a meaning of the second condition.

In conclusion, according to the technical solutions provided by the embodiments of the disclosure, the access network device establishes or updates the access network context based on the notification of the core network device, and then establishes the fifth association relationship between the access network contexts. When establishing or updating the configuration information contained in the access network contexts, the access network may refer to the configuration information contained in the access network context established by other logical terminal devices associated with the fifth association relationship, so that the collaboration of the behaviors among a plurality of cards contained one terminal device may be maintained as much as possible, thereby facilitating energy conservation of the terminal device.

Meanwhile, the fifth association relationship and the sixth association relationship corresponding to the access network context may be transferred between the access network devices, which avoids the communication overhead caused by re-establishing the above two association relationships.

It is to be noted that, in the method embodiments, the technical solutions of the disclosure are described mainly from the perspective of interaction among a terminal device, an access network device, and a core network device. The above steps related to the execution of the terminal device may be independently implemented as a communication method on a terminal device side. The above steps related to the execution of the access network device may be independently implemented as a communication method on an access network device side. The above steps related to the execution of the core network device may be independently implemented as a communication method on a core network device side.

The following are apparatus embodiments of the disclosure, which may be configured to implement the method embodiments of the disclosure. Details undisclosed in the apparatus embodiments of the disclosure may refer to the method embodiments of the present application.

Figure 12:
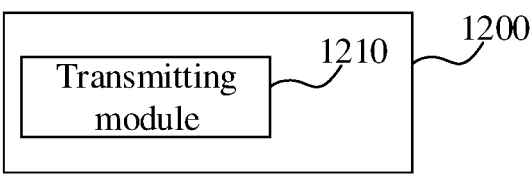
FIG. 12 is a block diagram of a communication apparatus provided by one embodiment of the disclosure.

Reference is made to FIG. 12, which is a block diagram of a communication apparatus provided by an embodiment of the disclosure. The apparatus has the functions for implementing the method on the terminal device side. The functions may be implemented through hardware, or may be implemented through hardware by executing corresponding software. The apparatus may be a terminal device described hereinabove, or may be installed in the terminal device. As shown in FIG. 12, the apparatus 1200 may include a transmitting module 1210.

The transmitting module 1210 is configured to transmit a first message to a network device. The first message carries collaborative operation related information which is related to at least one SIM card of the apparatus.

In an exemplary embodiment, the collaborative operation related information includes at least one of:

terminal device identity information; or network temporary identity information corresponding to the at least one SIM card. The network temporary identity information includes at least one of: access network temporary identity information or core network temporary identity information.

In an exemplary embodiment, the collaborative operation related information further includes at least one of:

collaborative operation request information; or collaborative operation request auxiliary information.

In an exemplary embodiment, the apparatus further includes a receiving module. The receiving module is configured to receive a first response message transmitted by the network device, the first response message is used for responding the first message.

In an exemplary embodiment, the first response message carries first indication information, and the first indication information is configured to indicate whether the network device accepts the apparatus performing collaborative operation.

In an exemplary embodiment, in response to the first indication information, the network device is indicated to accept the apparatus performing the collaborative operation, the first response message carries application scope configuration information, and the disclosure scope configuration information is configured to indicate a related configuration participating in the collaborative operation.

In an exemplary embodiment, the collaborative operation related information includes the following information: collaborative operation request information.

In an exemplary embodiment, the apparatus further includes a receiving module. The receiving module is configured to receive a second response message transmitted by the network device, and the second response message is used for responding the first message.

In an exemplary embodiment, the second response message carries at least one of: second indication information or first request information. The second indication information is configured to indicate the network device whether to accept the apparatus performing the collaborative operation, and the first request information is used for requesting the apparatus to report at least one of: terminal device identity information; or network temporary identity information corresponding to at least one SIM card. The network temporary identity information includes at least one of: access network temporary identity information or core network temporary identity information.

In an exemplary embodiment, the first request information is further used for requesting the apparatus to report the collaborative operation request auxiliary information.

In an exemplary embodiment, the transmitting module 1210 is configured to transmit a second message transmitted by the network device. The second message carries data requested by the first request information.

In an exemplary embodiment, the receiving module is configured to receive a third response message transmitted by the network device, and the third response message is used for responding the second message.

In an exemplary embodiment, the third response message carries at least one of: third indication information or application scope configuration information. The third indication information is configured to indicate whether the network device accepts the collaborative operation. The disclosure scope configuration information is configured to indicate a related configuration participating in the collaborative operation.

In an exemplary embodiment, the related configuration participating in the collaborative operation includes at least one configuration of:

temporary network identity information corresponding to the at least one SIM card participating in the collaborative operation, the network temporary identity information includes at least one of: access network temporary identity information or core network temporary identity information;

card identity information of at least one SIM card participating in the collaborative operation; or at least one task type configuration participating in the collaborative operation.

In an exemplary embodiment, the collaborative operation request auxiliary information includes at least one of:

card identity information of at least one SIM card participating in the collaborative operation; or operator information supported by at least one SIM card participating in the collaborative operation; or task type scope information participating in the collaborative operation.

In an exemplary embodiment, the access network temporary identity information further includes at least one of the following: C-RNTI, or I-RNTI.

In an exemplary embodiment, the network device is at least one of an access network device, or a core network device.

In an exemplary embodiment, the apparatus further includes a mode enabling module. The mode enabling module is configured to enable a multi-card collaborative operation mode in response to a successful negotiation of the collaborative operation.

The multi-card collaborative operation mode allows the apparatus to check related data of a preset task corresponding to other SIM cards participating in the collaborative operation first before performing the preset task, or allows the apparatus to transmit the related data of the preset task to the other SIM cards participating in the collaborative operation for use after completing the preset task.

In an exemplary embodiment, the network device is a core network device. The mode enabling mode is configured to for an NAS of the apparatus to enable the multi-card collaborative operation mode, and transmit a first notification message to an AS of the apparatus.

The first notification message is used for notifying the AS to enable the multi-card collaborative operation mode.

In an exemplary embodiment, the first notification message includes at least one of:

indication information allowing to enable the multi-card collaborative operation mode;

card identity information of at least one SIM card participating in the collaborative operation; or core network temporary identity information corresponding to the at least one SIM card participating in the collaborative operation; or task type scope information participating in the collaborative operation.

In an exemplary embodiment, the preset task includes at least one of:

a system information acquisition task, a system information update task, a measurement related task, a paging receiving task, a configuration update task, or a re-registration task.

In an exemplary embodiment, the related data of the preset task includes at least one of:

configuration data; or enabling data for enabling the preset task.

In an exemplary embodiment, the related data of the preset task further includes at least one of:

data calculated according to the configuration data; or data obtained according to a measurement process.

In an exemplary embodiment, the apparatus further includes a receiving module. The receiving module is configured to receive fourth indication information transmitted by an access network device, and the fourth indication information is configured to indicate whether to allow the apparatus to initiate negotiation of the collaborative operation.

In an exemplary embodiment, the fourth indication information is carried in a system broadcast message; or, the fourth indication information is carried in dedicated signaling.

In an exemplary embodiment, the apparatus further includes a receiving module. The receiving module is configured to receive fourth indication information transmitted by a core network device, and the fourth indication information is configured to indicate whether to allow the apparatus to initiate negotiation of the collaborative operation.

In an exemplary embodiment, the fourth indication information is carried in NAS signaling.

In an exemplary embodiment, the apparatus further includes a capability determination module. The capability determination module is configured to whether to be allowed to initiate negotiation of the collaborative operation according to capability information supported by the apparatus.

In conclusion, according to the technical solutions provided by the embodiments of the disclosure, in a case that the terminal device is a multi-card terminal, the terminal device transmits the first message carrying the collaborative operation related information to the network device, thereby negotiating with the network device to use a plurality of SIM cards to perform collaborative operation. Due to similar data required for some tasks among the plurality of SIM cards, communication with the network device can be reduced by performing the collaborative operation by using the plurality of SIM cards, which is beneficial for saving electricity of the terminal device.

Figure 13:
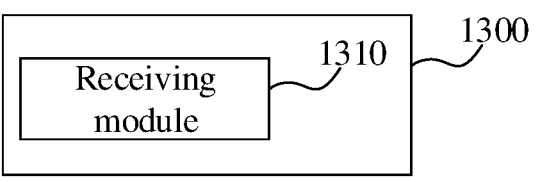
FIG. 13 is block diagram of a communication apparatus provided by another embodiment of the disclosure.

Refer to FIG. 13, which is a block diagram of a communication apparatus provided by one embodiment of the disclosure. The apparatus has the functions for implementing the method on a network device side. The functions may be implemented through hardware, or may be implemented through hardware by executing corresponding software. The apparatus may be a network device described hereinabove, or may be installed in the network device. As shown in FIG. 13, the apparatus 1300 may include a receiving module 1310.

The receiving module 1310 is configured to receive the first message transmitted by the terminal device. The first message carries collaborative operation related information which is related to at least one SIM card of the terminal device.

In an exemplary embodiment, the collaborative operation related information includes at least one of: terminal device identity information, or network temporary identity information corresponding to at least one SIM card. The network temporary identity information includes at least one of: access network temporary identity information or core network temporary identity information.

In an exemplary embodiment, the collaborative operation related information further includes at least one of:

collaborative operation request information, or collaborative operation request auxiliary information.

In an exemplary embodiment, the apparatus further includes a transmitting module. The transmitting module is configured to transmit a first response message to the terminal device. The first response message is used for responding the first message.

In an exemplary embodiment, the first response message carries first indication information, and the first indication information is configured to indicate whether the apparatus accepts the terminal device performing a collaborative operation.

In an exemplary embodiment, in response to the first indication information, the apparatus is indicated to accept the terminal device performing the collaborative operation, the first response message carries application scope configuration information, and the disclosure scope configuration information is configured to indicate a related configuration participating in the collaborative operation.

In an exemplary embodiment, the collaborative operation related information includes the following information: collaborative operation request information.

In an exemplary embodiment, the apparatus further includes a transmitting module. The transmitting module is configured to transmit a second response message to the terminal device. The second response message is used for responding the first message.

In an exemplary embodiment, the second response message carries at least one of: second indication information or first request information.

The second indication information is configured to indicate the apparatus whether to accept the terminal device performing the collaborative operation, and the first request information is used for requesting the terminal device to report at least one of: terminal device identity information, or network temporary identity information corresponding to at least one SIM card, the network temporary identity information including at least one of: access network temporary identity information or core network temporary identity information.

In an exemplary embodiment, the first request information is further used for requesting the terminal device to report the collaborative operation request auxiliary information.

In an exemplary embodiment, the receiving module 1310 is configured to transmit a second message transmitted by the terminal device. The second message carries data requested by the first request information.

In an exemplary embodiment, the transmitting module is configured to transmit a third response message to the terminal device, and the third response message is used for responding the second message.

In an exemplary embodiment, the third response message carries at least one of: third indication information or application scope configuration information.

The third indication information is configured to indicate the apparatus whether to accept the terminal device performing the collaborative operation, and the disclosure scope configuration information is configured to indicate a related configuration participating in the collaborative operation.

In an exemplary embodiment, the related configuration participating in the collaborative operation includes at least one configuration of:

temporary network identity information corresponding to the at least one SIM card participating in the collaborative operation, the network temporary identity information includes at least one of: access network temporary identity information or core network temporary identity information;

card identity information of at least one SIM card participating in the collaborative operation; or at least one task type configuration participating in the collaborative operation.

In an exemplary embodiment, the collaborative operation request auxiliary information includes at least one of:

card identity information of at least one SIM card participating in the collaborative operation; or operator information supported by at least one SIM card participating in the collaborative operation; or task type scope information participating in the collaborative operation.

In an exemplary embodiment, the apparatus further includes a transmitting module. The transmitting module is configured to transmit fourth indication information to the terminal device. The fourth indication information is configured to indicate whether to allow the terminal device to initiate negotiation of the collaborative operation.

In an exemplary embodiment, the apparatus is an access network device; the fourth indication information is carried in a system broadcast message; or, the fourth indication information is carried in dedicated signaling.

In an exemplary embodiment, the apparatus is a core network device; and the fourth indication information is carried in NAS signaling.

In an exemplary embodiment, the apparatus is at least one of: an access network device, or a core network device.

In an exemplary embodiment, the apparatus is an access network device. The device further includes: an association relationship establishing module and a configuration information update module.

The association relationship establishing module is configured to establish a first association relationship between at least two access network contexts in response to the access network device accepting the terminal device performing the collaborative operation.

The configuration information update module is configured to update configuration information in any access network context of the at least two access network contexts based on the first association relationship.

In an exemplary embodiment, the association relationship establishing module is configured to establish the first association relationship between the at least two access network contexts in response to the at least two access network contexts satisfying a first condition.

the first condition being related to a second association relationship corresponding to an access network context, the second association relationship being configured to represent an association relationship between the access network context and a first logical identity, and the first logical identity being at least one of: terminal device identity information, collaborative operation identity information, or an access network temporary identity information set.

In an exemplary embodiment, the first condition includes:

the terminal device identity information associated with each of the second association relationships respectively corresponding to the at least two access network contexts is the same;

or, the collaborative operation identity information associated with each of the second association relationships respectively corresponding to the at least two access network contexts is the same;

or, the access network temporary identity information set associated with the second association relationship corresponding to a target access network context includes access network temporary identity information corresponding to the other access network contexts of the at least two access network contexts except the target access network context, the target access network context is any access network context of at least two access network contexts, or the target access network context being an access network context, for which the second association relationship is established, of the at least two access network contexts.

In an exemplary embodiment, the configuration information update module is configured to update, for the target access network context, the configuration information in the target access network context with reference to configuration information in other access network contexts except the target access network in the at least two access network contexts associated with the first association relationship, the target access network context being any access network context of the at least two access network contexts with the first association relationship.

In an exemplary embodiment, the configuration information in the access network context includes at least one of configuration information:

a layer 1 related configuration, a layer 2 related configuration, a layer 3 related configuration, a mobility related configuration, or an AS security related configuration.

In an exemplary embodiment, the apparatus further includes a context transferring module.

The context transferring module is configured to transfer the access network context to the target access network device through a first interface message. The first interface message further carries at least one of: the first association relationship corresponding to the access network context, or the second association relationship corresponding to the access network context.

In an exemplary embodiment, the apparatus is a core network device. The apparatus further includes: an association relationship establishing module and a configuration information update module.

The association relationship establishing module is configured to establish a third association relationship between at least two access network contexts in response to the access network device accepting the terminal device performing the collaborative operation.

The configuration information update module is configured to update configuration information in any access network context of the at least two access network contexts based on the third association relationship.

In an exemplary embodiment, the association relationship establishing module is configured to establish the third association relationship between the at least two access network contexts in response to the at least two access network contexts satisfying a second condition.

The second condition is related to a fourth association relationship corresponding to a core network context. The second association relationship is used for representing an association relationship between the core network context and a second logical identity. The second logical identity is at least one of: terminal device identity information, collaborative operation identity information, or a core network temporary identity information set.

In an exemplary embodiment, the second condition includes:

the terminal device identity information associated with each of the fourth association relationships respectively corresponding to the at least two core network contexts is the same;

or, the collaborative operation identity information associated with each of the fourth association relationships respectively corresponding to the at least two core network contexts is the same;

or, the core network temporary identity information set associated with the fourth association relationship corresponding to a target core network context includes core network temporary identity information corresponding to the other core network contexts except the target core network context of the at least two core network contexts, the target core network context is any core network context of at least two core network contexts, or the target core network context being an core network context, for which the fourth association relationship is established, of the at least two core network contexts.

In an exemplary embodiment, the configuration information update module is configured to update, for the target core network context, the configuration information in the target core network context with reference to configuration information in other core network contexts except the target core network in the at least two core network contexts associated with the third association relationship, the target core network context being any core network context of the at least two core network contexts with the third association relationship.

In an exemplary embodiment, the configuration information in the core network context includes at least one of configuration information:

core network temporary identity information, a NAS security related configuration, a registration area related configuration, a terminal NAS capability related configuration, or a channel address related configuration with an access network.

In an exemplary embodiment, the apparatus further includes: a context transferring module. The context transferring module is configured to notify an access network device to establish or update the access network context through a second interface message.

The second interface message further carries a second logical identity.

In an exemplary embodiment, the apparatus further includes: a context transferring module. The context transferring module is configured to transfer the core network context to the target core network device through a third interface message. The third interface message further carries at least one of: the third association relationship corresponding to the core network context; or the fourth association relationship corresponding to the core network context.

In an exemplary embodiment, the access network temporary identity information further includes at least one of the following: C-RNTI, or I-RNTI.

In conclusion, according to the technical solutions provided by the embodiments of the disclosure, in a case that the terminal device is a multi-card terminal, the terminal device transmits the first message carrying the collaborative operation related information to the network device, thereby negotiating with the network device to use a plurality of SIM cards to perform collaborative operation. Due to similar data required for some tasks among the plurality of SIM cards, communication with the network device can be reduced by performing the collaborative operation by using the plurality of SIM cards, which is beneficial for saving electricity of the terminal device.

Figure 14:
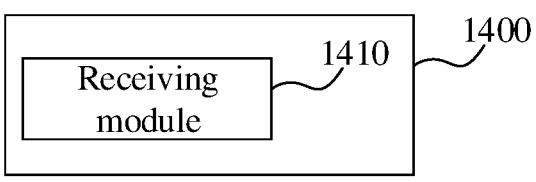
FIG. 14 is block diagram of a communication apparatus provided by another embodiment of the disclosure.

Refer to FIG. 14, which is a block diagram of a communication apparatus provided by one embodiment of the disclosure. The apparatus has the functions for implementing the method on an access network device side. The functions may be implemented through hardware, or may be implemented through hardware by executing corresponding software. The apparatus may be an access network device described hereinabove, or may be installed in the access network device. As shown in FIG. 14, the apparatus 1400 may include a receiving module 1410.

The receiving module 1410 is configured to receive a second interface message transmitted by a core network device. The second interface message is used for notifying the apparatus to establish or update the access network context.

The second interface message further carries a second logical identity. The second logical identity is at least one of: terminal device identity information, collaborative operation identity information, or a core network temporary identity information set.

In an exemplary embodiment, the apparatus further includes: an association relationship establishing module and a configuration information update module.

The association relationship establishing module is configured to establish a fifth association relationship between at least two access network contexts including the access network context in response to the second interface message.

The configuration information update module is configured to update configuration information in any access network context of the at least two access network contexts based on the fifth association relationship.

In an exemplary embodiment, the association relationship establishing module is configured to establish the fifth association relationship between the at least two access network contexts in response to the at least two access network contexts satisfying a third condition.

The third condition is related to a sixth association relationship corresponding to the access network context. The sixth association relationship is used for representing an association relationship between the access network context and a third logical identity. The third logical identity is at least one of: terminal device identity information, collaborative operation identity information, an access network temporary identity information set, or a core network temporary identity information set.

In an exemplary embodiment, the third condition includes:

the terminal device identity information associated with each of the sixth association relationships respectively corresponding to the at least two access network contexts is the same;

or, the collaborative operation identity information associated with each of the sixth association relationships respectively corresponding to the at least two access network contexts is the same;

or, the access network temporary identity information set associated with the sixth association relationship corresponding to a target access network context includes access network temporary identity information corresponding to the other access network contexts of the at least two access network contexts except the target access network context, the target access network context is any access network context of at least two access network contexts, or the target access network context being a core network context, for which the sixth association relationship is established, of the at least two access network contexts.

or, the core network temporary identity information set associated with the sixth association relationship corresponding to a target access network context includes core network temporary identity information corresponding to the other access network contexts of the at least two access network contexts except the target access network context, the target access network context is any access network context of at least two access network contexts, or the target access network context being a core network context, for which the sixth association relationship is established, of the at least two access network contexts.

In an exemplary embodiment, the configuration information update module is configured to update, for the target access network context, the configuration information in the target access network context with reference to configuration information in other access network contexts except the target access network in the at least two access network contexts associated with the fifth association relationship, the target access network context being any access network context of the at least two access network contexts with the fifth association relationship.

In an exemplary embodiment, the configuration information in the access network context includes at least one of configuration information:

a layer 1 related configuration, a layer 2 related configuration, a layer 3 related configuration, a mobility related configuration, or an AS security related configuration.

In an exemplary embodiment, the apparatus further includes a context transferring module.

The context transferring module is configured to transfer the access network context to the target apparatus through a fourth interface message. The fourth interface message further carries at least one of: the fifth association relationship corresponding to the access network context, or the sixth association relationship corresponding to the access network context.

In an exemplary embodiment, the access network temporary identity information further includes at least one of the following: C-RNTI, or I-RNTI.

In an exemplary embodiment, the apparatus further includes an indication information transmitting module.

The indication information transmitting module is configured to transmit the fourth indication information to the terminal device. The fourth indication information is configured to indicate whether to allow the terminal device to initiate negotiation of the collaborative operation.

In an exemplary embodiment, the fourth indication information is carried in a system broadcast message; or, the fourth indication information is carried in dedicated signaling.

In conclusion, according to the technical solutions provided by the embodiments of the disclosure, the access network device establishes or updates the access network context based on the notification of the core network device, and then establishes the fifth association relationship between the access network contexts. When establishing or updating the configuration information contained in the access network contexts, the access network may refer to the configuration information contained in the access network context established by other logical terminal devices associated with the fifth association relationship, so that the collaboration of the behaviors among a plurality of cards contained one terminal device may be maintained as much as possible, thereby facilitating energy conservation of the terminal device.

It is to be noted that, when functions of the apparatus provided by the abovementioned embodiment are realized, only the division of various abovementioned functional modules is exemplified. In actual applications, the abovementioned functions can be assigned by different functional modules according to actual needs, that is, the content structure of the device is divided into different functional modules to complete all or part of the functions described above.

With regard to the apparatus in the above-mentioned embodiments, specific modes of performing operations by each module are described in detail in the embodiments related to the method, which is not described in detail herein.

Figure 15:
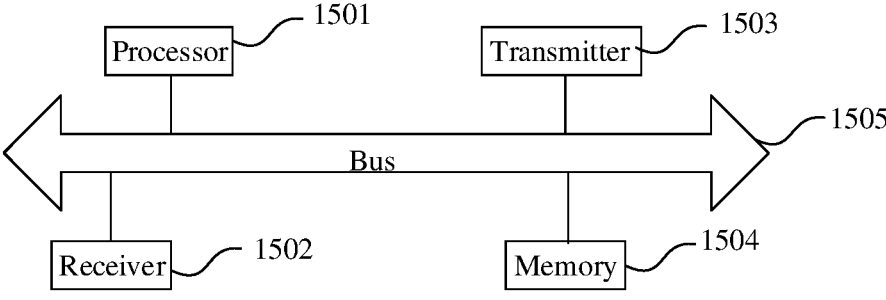
FIG. 15 is a schematic structural diagram of a communication device provided by an embodiment of the disclosure.

Refer to FIG. 15, which is a schematic structural diagram of a communication device (for example, a terminal device, an access network device, and a core network device) provided by an embodiment of the disclosure. The communication device may include: a processor 1501, a receiver 1502, a transmitter 1503, a memory 1504, and a bus 1505.

The processor 1501 includes one or more processing cores. The processor 1501 executes various functional applications and information processing by running software programs and modules.

The receiver 1502 and the transmitter 1503 may be implemented as a transceiver 1506. The transceiver 1506 may be a communication chip.

The memory 1504 is connected to the processor 1501 through the bus 1505.

The memory 1504 may be configured to store a computer program. The processor 1501 is configured to execute the computer program to implement various steps executed by the terminal device in the above method embodiments.

In addition, the memory 1504 may be implemented by any type of volatile or nonvolatile storage devices or a combination thereof. The volatile or nonvolatile storage devices include, but are not limited to: a Random-Access Memory (RAM), a Read-Only Memory (ROM), an Erasable Programmable Read-Only Memory (EPROM), an Electrically Erasable Programmable Read-Only Memory (EEPROM), a flash memory or other solid-state storage technologies, a Compact Disc Read-Only Memory (CD-ROM), Digital Video Disc (DVD), or other optical storage devices, magnetic tape cassettes, magnetic tapes, magnetic disk storage devices, or other magnetic storage devices.

When the communication device is implemented as a terminal device, the processor and the transceiver involved in the embodiments of the disclosure may execute the steps executed by the terminal device in any of the methods shown in FIG. 2 to FIG. 5 and FIG. 7 to FIG. 9, which will not be elaborated herein.

In a possible implementation, when the communication device implements the terminal device,
 the transceiver is configured to transmit a first message to an access network device. The first message carries collaborative operation related information which is related to at least one SIM card of the terminal device.

When the communication device is implemented as an access network device, the transceiver involved in the embodiments of the disclosure may execute the steps executed by the access network device in any of the methods shown in FIG. 2 to FIG. 4, and FIG. 6, which will not be elaborated herein.

In a possible implementation, when the communication device is implemented as the access network device,
 the transceiver is configured to receive a first message transmitted by a terminal device, the first message carrying collaborative operation related information which is related to at least one SIM card of the terminal device.

When the communication device is implemented as a core network device, the transceiver involved in the embodiments of the disclosure may execute the steps executed by the core network device in any of the methods as shown in FIG. 2, FIG. 7, FIG. 8, FIG. 10, and FIG. 11, which will not be elaborated herein.

In a possible implementation, when the communication device is implemented as the core network device,
 the transceiver is configured to receive a first message transmitted by a terminal device, the first message carrying collaborative operation related information which is related to at least one SIM card of the terminal device.

When the communication device is implemented as the access network device, the transceiver involved in the embodiments of the disclosure may execute the steps executed by the access network device of the method as shown in FIG. 11, which will not be elaborated herein.

In a possible implementation, when the communication device is implemented as the access network device,
 the transceiver is configured to receive a second interface message transmitted by a core network device. The second interface message is used for notifying the access network device to establish or update the access network context.

The second interface message further carries a second logical identity. The second logical identity is at least one of: terminal device identity information, collaborative operation identity information, or a core network temporary identity information set.

The embodiments of the disclosure further provide a computer-readable storage medium. The computer-readable storage medium stores a computer program. The computer program is executed by the processor of the terminal device to implement the communication method on the terminal device side.

The embodiments of the disclosure further provide a computer-readable storage medium. The computer-readable storage medium stores a computer program. The computer program is executed by the processor of the access network device to implement the communication method on the access network side.

The embodiments of the disclosure further provide a computer-readable storage medium. The computer-readable storage medium stores a computer program. The computer program is executed by the processor of the core network device to implement the communication method on the core network side.

Optionally, the computer-readable storage medium may include: a ROM, a RAM, an SSD, a compact disk, and the like. The RAM may include a Resistance Random Access Memory (ReRAM) and a Dynamic Random Access Memory (DRAM).

The embodiments of the disclosure further provide a chip. The chip includes a programmable logic circuit and/or a program instruction. The chip is configured to implement the communication method on the terminal device side when running on the terminal device side.

The embodiments of the disclosure further provide a chip. The chip includes a programmable logic circuit and/or a program instruction. The chip is configured to implement the communication method on the access network device when running on the access network device side.

The embodiments of the disclosure further provide a chip. The chip includes a programmable logic circuit and/or a program instruction. The chip is configured to implement the communication method on the core network device when running on the core network device side.

The embodiments of the disclosure further provide a computer program product or a computer program. The computer program product or the computer program includes a computer instruction. The computer instruction is stored in the computer-readable storage medium. A processor of a terminal device reads and executes the computer instruction from the computer-readable storage medium to implement the communication method on the core network device side.

The embodiments of the disclosure further provide a computer program product or a computer program. The computer program product or the computer program includes a computer instruction. The computer instruction is stored in the computer-readable storage medium. A processor of an access network device reads and executes the computer instruction from the computer-readable storage medium to implement a communication method on the access network device side.

The embodiments of the disclosure further provide a computer program product or a computer program. The computer program product or the computer program includes a computer instruction. The computer instruction is stored in the computer-readable storage medium. A processor of a core network device reads and executes the computer instruction from the computer-readable storage medium to implement a communication method on the core network device side.

It is to be understood that the "indication" mentioned in the embodiments of the disclosure may be direct indication, or indirect indication, or indicate that there is an association relationship. For example, A indicating B may indicate that A directly indicates B, for example, B may be acquired through A, or indicate that A indirectly indicates B, for example, A indicates C, and B may be acquired through C, or indicate that there is an association relationship between A and B.

In the description of the embodiments of the disclosure, the term "correspondence" can indicate that there is a direct or indirect correspondence between the two, or that there is an association between them, or that there is a relationship between indication and being indicated, configuration and being configured, etc.

"A plurality of" mentioned herein means two or more. The term "and/or" is an association describing associated objects, indicating that there may be three relationships. For example, A and/or B may indicate that A exists separately, both A and B exist simultaneously, and B exists separately. The character "/" generally indicates that the contextual object is an "or" relationship.

In addition, step numbers described herein only exemplarily show a possible execution sequence among steps. In some other embodiments, the above steps may also be executed without following a number order, for example, two steps with different numbers are executed simultaneously, or two steps with different numbers are executed in the opposite order as shown in the figures, which will not be limited in the embodiments of the disclosure.

A person skilled in the art should be aware that in the foregoing one or more examples, the functions described in the embodiments of the disclosure may be implemented by hardware, software, firmware, or any combination thereof. When software is used for implementation, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible by a general-purpose or dedicated computer.

The above is only exemplary embodiments of the disclosure and is not intended to limit the disclosure. Any modifications, equivalent replacements, improvements and the like made within the spirit and principle of the disclosure shall fall within the scope of protection of the disclosure.

The invention claimed is:

1. A communication method, performed by a terminal device, comprising:
   transmitting a first message to a network device, the first message carrying collaborative operation related information which is related to at least one Subscriber Identity Module (SIM) card of the terminal device; wherein the collaborative operation related information comprises at least one of: terminal device identity information; or network temporary identity information corresponding to the at least one SIM card, the network temporary identity information comprising at least one of: access network temporary identity information or core network temporary identity information;
   receiving a first response message transmitted by the network device, the first response message being configured to respond to the first message; wherein the first response message carries first indication information, and the first indication information is configured to indicate whether the network device accepts the terminal device performing a collaborative operation;
   wherein in response to the first indication information indicating the network device accepts the terminal device performing the collaborative operation, the first response message carries application scope configuration information configured to indicate a related configuration participating in the collaborative operation.

2. The method of claim 1, wherein the collaborative operation related information further comprises at least one of:

collaborative operation request information; or collaborative operation request auxiliary information.

3. The method of claim 1, wherein the collaborative operation related information comprises:

collaborative operation request information.

4. The method of claim 1, further comprising:

receiving a second response message transmitted by the network device, the second response message being configured to respond to the first message, wherein the second response message carries at least one of: second indication information or first request information; and the second indication information is configured to indicate whether the network device accepts the terminal device performing the collaborative operation, and the first request information is used for requesting the terminal device to report at least one of: terminal device identity information, or network temporary identity information corresponding to at least one SIM card, the network temporary identity information comprises at least one of: access network temporary identity information or core network temporary identity information.

5. The method of claim 1, further comprising:

enabling a multi-card collaborative operation mode in response to a successful negotiation of the collaborative operation, wherein the multi-card collaborative operation mode allows the terminal device to check related data of a preset task corresponding to other SIM cards participating in the collaborative operation first before performing the preset task, or allows the terminal device to transmit the related data of the preset task to the other SIM cards participating in the collaborative operation for use after completing the preset task, wherein the network device is a core network device, and enabling the multi-card collaborative operation mode comprises:

enabling, by a Non-Access Stratum (NAS) of the terminal device, the multi-card collaborative operation mode, and transmitting a first notification message to an Access Stratum (AS) of the terminal device, the first notification message being configured to notify the AS to enable the multi-card collaborative operation mode.

6. The method of claim 1, wherein the at least one SIM card comprises a plurality of SIM cards.

7. A communication method, performed by a network device, comprising:

receiving a first message transmitted by a terminal device, the first message carrying collaborative operation related information which is related to at least one Subscriber Identity Module (SIM) card of the terminal device; wherein the collaborative operation related information comprises at least one of: terminal device identity information; or network temporary identity information corresponding to the at least one SIM card, the network temporary identity information comprising at least one of: access network temporary identity information or core network temporary identity information;

transmitting a first response message to the terminal device, the first response message being configured to respond to the first message; wherein the first response message carries first indication information, the first indication information is configured to indicate whether the network device accepts the terminal device performing a collaborative operation;

wherein in response to the first indication information indicating the network device accepts the terminal device performing the collaborative operation, the first response message carrying application scope configuration information configured to indicate a related configuration participating in the collaborative operation.

8. The method of claim 7, wherein the collaborative operation related information further comprises at least one of:

collaborative operation request information; or collaborative operation request auxiliary information.

9. The method of claim 7, wherein the collaborative operation related information comprises:

collaborative operation request information.

10. The method of claim 7, further comprising:

transmitting a second response message to the terminal device, the second response message being configured to respond to the first message.

11. The method of claim 10, wherein the second response message carries at least one of: second indication information or first request information; and the second indication information is configured to indicate whether the network device accepts the terminal device performing the collaborative operation, and the first request information is used for requesting the terminal device to report at least one of: terminal device identity information, or network temporary identity information corresponding to at least one SIM card, the network temporary identity information comprising at least one of: access network temporary identity information or core network temporary identity information, wherein the first request information is further used for requesting the terminal device to report the collaborative operation request auxiliary information.

12. The method of claim 7, wherein the network device is an access network device, and the method further comprises:

establishing a first association relationship between at least two access network contexts in response to the access network device accepting the terminal device performing the collaborative operation; and updating configuration information in any access network context of the at least two access network contexts based on the first association relationship, wherein the establishing a first association relationship between at least two access network contexts comprises:

establishing the first association relationship between the at least two access network contexts in response to the at least two access network contexts satisfying a first condition, the first condition being related to a second association relationship corresponding to an access network context, the second association relationship being configured to represent an association relationship between the access network context and a first logical identity, and the first logical identity being at least one of: terminal device identity information, collaborative operation identity information, or an access network temporary identity information set.

13. A terminal device, comprising a transceiver configured to:

transmit a first message to a network device, the first message carrying collaborative operation related information which is related to at least one Subscriber Identity Module (SIM) card of the terminal device; wherein the collaborative operation related information comprises at least one of: terminal device identity information; or network temporary identity information corresponding to the at least one SIM card, the network temporary identity information comprising at least one of: access network temporary identity information or core network temporary identity information;

receive a first response message transmitted by the network device, the first response message being configured to respond to the first message; wherein the first response message carries first indication information, and the first indication information is configured to indicate whether the network device accepts the terminal device performing a collaborative operation;

wherein in response to the first indication information indicating the network device accepts the terminal device performing the collaborative operation, the first response message carries application scope configuration information configured to indicate a related configuration participating in the collaborative operation.

\* \* \* \* \*

62